(12) United States Patent
Sears

(10) Patent No.: US 12,434,865 B2
(45) Date of Patent: Oct. 7, 2025

(54) WORKSTATION FOR MICROGRAVITY ENVIRONMENTS

(71) Applicant: SATED Space LLC, Boulder, CO (US)

(72) Inventor: James Thomas Sears, Boulder, CO (US)

(73) Assignee: SATED Space LLC, Boulder, CO (US)

( * ) Notice: Subject to any disclaimer, the term of this patent is extended or adjusted under 35 U.S.C. 154(b) by 0 days.

(21) Appl. No.: 18/457,272

(22) Filed: Aug. 28, 2023

(65) Prior Publication Data
US 2024/0067367 A1    Feb. 29, 2024

Related U.S. Application Data

(60) Provisional application No. 63/401,396, filed on Aug. 26, 2022.

(51) Int. Cl.
*B01D 46/10* (2006.01)
*B01D 46/48* (2006.01)
*B64G 1/60* (2006.01)
*B64G 4/00* (2006.01)

(52) U.S. Cl.
CPC ............ *B64G 4/00* (2013.01); *B01D 46/10* (2013.01); *B01D 46/48* (2013.01)

(58) Field of Classification Search
CPC .......... B01D 46/10; B01D 46/48; B64G 1/60; B64G 4/00
USPC ........... 55/385.1, 471, 484, 493, 506, 385.2; 108/60, 66, 77
See application file for complete search history.

(56) References Cited

U.S. PATENT DOCUMENTS

| | | | |
|---|---|---|---|
| 4,836,114 A * | 6/1989 | Cohen ............... | A47B 13/023 108/77 |
| 6,162,270 A * | 12/2000 | Nystrom ............. | B05B 14/43 55/525 |
| 6,290,740 B1 * | 9/2001 | Schaefer ............ | B01D 46/10 55/385.2 |
| 7,040,239 B2 * | 5/2006 | Shelton ............. | B01D 46/02 108/50.13 |
| 8,430,940 B2 * | 4/2013 | Nguyen ............. | A47L 7/0066 132/73 |
| 9,114,444 B1 * | 8/2015 | Lam ................. | B08B 15/00 |
| 9,656,426 B2 | 5/2017 | Snyder et al. | |
| 9,844,306 B1 * | 12/2017 | Fitzpatrick ......... | B25H 1/20 |

(Continued)

OTHER PUBLICATIONS

Vacuum Tables for CNC Machining Centers and CNC Milling Machines, https://www.datron.com/resources/blog/vacuum-tables-for-cnc-machining-centers-and-cnc-milling-machines/, accessed Nov. 8, 2022.

*Primary Examiner* — Duane Smith
(74) *Attorney, Agent, or Firm* — Avek IP, LLC

(57) ABSTRACT

A workstation for microgravity environments is provided that prevents objects from floating around inside a spacecraft. The workstation includes a downdraft table that has a plenum chamber with an inlet and an outlet. A fan is disposed in the plenum chamber for drawing air into the plenum via the inlet, and exhausting air from the plenum via the outlet. A metal grate is disposed across the inlet, and an air resistive stack is disposed on an outer side of the metal grate. The air resistive stack includes an inner resistive layer disposed on the metal grate and an outer resistive layer disposed on the inner layer. The workstation improves a user's ability to perform many activities in a microgravity environment.

17 Claims, 19 Drawing Sheets

(56) References Cited

U.S. PATENT DOCUMENTS 10,357,736 B2 * 7/2019 Prather ................ B01D 46/48
10,376,827 B2 * 8/2019 Cole ................ B01D 46/0086

* cited by examiner

ORIGIN OF MICROGRAVITY IN ORBIT AROUND THE EARTH

MICROGRAVITY ABOARD THE INTERNATIONAL SPACE STATION (ISS)

MICROGRAVITY ACHIEVED THROUGH PARABOLIC FLIGHT MANUVERS

MICROGRAVITY ACHIEVED DURING PARABOLIC FLIGHT

DOWNDRAFT TABLE PERSPECTIVE VIEW WITH RESISTANCE LAYERS PULLED BACK

DOWNDRAFT TABLE SIDE VIEW

DOWNDRAFT RETENTION FORCE EXPERIMENT SETUP

FIG. 9A

PROTOTYPE SPECIFICATIONS

TABLE AREA         27 X 58 cm = 1,566 cm*2 = 0.157 M*2
FAN TYPE           10" DIAMETER 12 VOLT PART #390 DC RADIATOR FAN
RESISTANCE MEDIA  MERV 13 POLYESTER FILTER CLOTH

FIG. 9B

OBJECT DOWNWARD FORCE AT 50 cm/sec RESISTIVE MEDIA INFLOW VELOCITY

| DOWNWARD FORCE VS. LIFT-OFF DISTANCE | LIFTOFF DISTANCE | 2 mm | 7 mm | 1 cm | 2 cm | 3 cm | 4 cm | 5 cm |
|---|---|---|---|---|---|---|---|---|
| CHICKEN 11.5 X 16.5 cm 2 FILTER LAYERS | FORCE GMS | 9.4 | 4.1 | 2.7 | 1.5 | 1.0 | .6 | .5 |
| CHICKEN 11.5 X 16.5 cm NO-FILTER-MID | FORCE GMS | 2.0 | 1.9 | 1.8 | 1.4 | 1.2 | 1.0 | 0.8 |
| CHICKEN 11.5 X 16.5 cm NO-FILTER-SIDE | FORCE GMS | 0.7 | 0.07 | 0.6 | 0.5 | 0.5 | 0 | - |
| PLAYING CARD BOX 6.5 X 9 cm 2 FILTER | FORCE GMS | 8.0 | 1.57 | 0.65 | 0.25 | 0.15 | 0.09 | 0.07 |
| PLAYING CARD BOX 6.5 X 9 cm NO-FILTER-MID | FORCE GMS | 0.37 | 0.31 | 0.28 | 0.26 | 0.22 | 0.20 | 0.17 |
| PLAYING CARD BOX 6.5 X 9 cm NO-FILTER-SIDE | FORCE GMS | 0.06 | 0.07 | 0.07 | 0.06 | 0.04 | 0.04 | 0.03 |
| FLAT BOX 11.5 X 16.5 cm 2 FILTER LAYERS | FORCE GMS | 35 | 9.7 | 4.5 | 1.7 | 1.1 | 0.7 | 0.6 |
| OFFICE SCISSORS 20 cm LONG 2 FILTER LAYERS | FORCE GMS | 0.31 | 0.21 | 0.14 | 0.12 | 0.11 | 0.09 | 0.07 |
| 50 ml 1/2 FULL SYRINGE 19 X 3.1 DIA 2 FILTER | FORCE GMS | 0.25 | 0.15 | 0.12 | 0.08 | 0.06 | 0.04 | 0 |
| 10 ml 1/2 FULL SYRINGE 13 X 1.6 DIA 2 FILTER | FORCE GMS | 0.08 | 0.04 | 0.03 | 0 | - | - | - |
| SCREWDRIVER 9 cm X 3 cm DIA 2 FILTER LAY | FORCE GMS | 0.07 | 0.04 | 0.02 | 0 | - | - | - |

PRESSURE AND ELECTRICAL POWER VS. FLOW AND NUMBER OF FLOW RESISTANCE LAYERS

|  | P1 PASCALS | P2 | VOLTS | WATTS | WATTS/M*2 |
|---|---|---|---|---|---|
| 25 cm/SECOND 2 FILTERS LAYERS | 13 PA | 7 PA | 6.2 | 15 | 95 |
| 50 cm/SECOND 2 FILTER LAYERS | 22 PA | 11 PA | 8.1 | 28 | 178 |
| 50 cm/SECOND 1 FILTER LAYER | 11 PA | NA | 6.4 | 16 | 102 |
| 50 cm/SECOND NO FILTER | AMBIENT 0 PA | AMBIENT 0 PA | 3.3 | 3.1 | 20 |
| 0 cm/SECOND BLOCKED FILTER | 10 PA | NA | 3.9 | 5.1 | 32 |

*FIG. 9C*

TEST OBJECTS

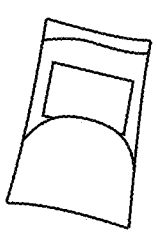
CHICKEN

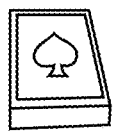
PLAYING CARD BOX

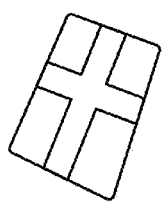
FLAT BOX

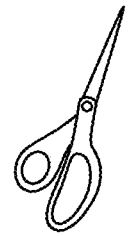
OFFICE SCISSORS

50 ml SYRINGE

10 ml SYRINGE

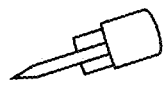
SCREWDRIVER

*FIG. 9D*

SAFELY REMOVING FOULED OUTER RESISTIVE LAYER IN MICROGRAVITY

DOWNDRAFT TABLE READY FOR LAYING DOWN FRESH OUTER RESISTIVE FILTER LAYER

SKYLAB SPACE STATION FOOT AND THIGH RESTRAINT MICROGRAVITY WORKSTATION

PRIOR ART KNEE PRESSURE GRIP MICROGRAVITY RESTRAINT CONCEPT

KNEE PRESSURE GRIP MICROGRAVITY RESTRAINT CONCEPT

PADDED BLADE SADDLE PROFILE

PADDED BLADE SADDLE SEAT

SECTION A - A'

PADDED BLADE SADDLE SECTION

SECTION B - B'

WORKSTATION FOR MICROGRAVITY ENVIRONMENTS

CROSS-REFERENCE TO RELATED APPLICATIONS

This application claims the benefit of priority of U.S. Provisional Patent Application No. 63/401,396, entitled Workstation for Microgravity Environments, filed on Aug. 26, 2022, the disclosure of which is herein incorporated by reference in its entirety.

BACKGROUND

Field

The disclosed embodiments relate generally to the field of spaceflight microgravity environments. More specifically, the disclosed embodiments relate to a workstation device for assisting people in spaceflight microgravity environments.

Related Art

Prior downdraft tables are known. For example, U.S. Pat. No. 7,040,239 to Shelton et al. describes a downdraft table used to collect dust and debris from a workstation. Shelton describes the use of a downdraft mat member that is composed of very rigid, durable plastic with multiple through points to provide collection of dust, debris and other loose materials. U.S. Pat. No. 9,656,426 to Snyder et al. describes an environmental control unit for a workspace that protects the surrounding environment from gases, dust, debris, etc. U.S. Pat. No. 9,844,306 to Fitzpatrick et al. describes a downdraft table used to collect dust and debris from a workstation that may include a filter. U.S. Pat. No. 10,357,736 to Prather et al. describes a downdraft table used to collect dust and debris from a workstation that provides uniform airflow through perforated holes in the table surface.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a workstation for microgravity environments, includes: a downdraft table, including: a plenum chamber having an inlet and an outlet; a fan disposed in the plenum chamber, wherein the fan is configured to draw air into the plenum via the inlet and exhaust air from the plenum via the outlet; a metal grate disposed across the inlet; and an air resistive stack disposed on an outer side of the metal grate, wherein the air resistive stack includes: an inner resistive layer disposed on the metal grate; and an outer resistive layer disposed on the inner layer.

BRIEF DESCRIPTION OF THE DRAWING FIGURES

Illustrative embodiments of the present disclosure are described in detail below with reference to the attached drawing figures, which are incorporated by reference herein and wherein:

FIG. 8b is a side view of a downdraft table of FIG. 8a;

Figure 10:
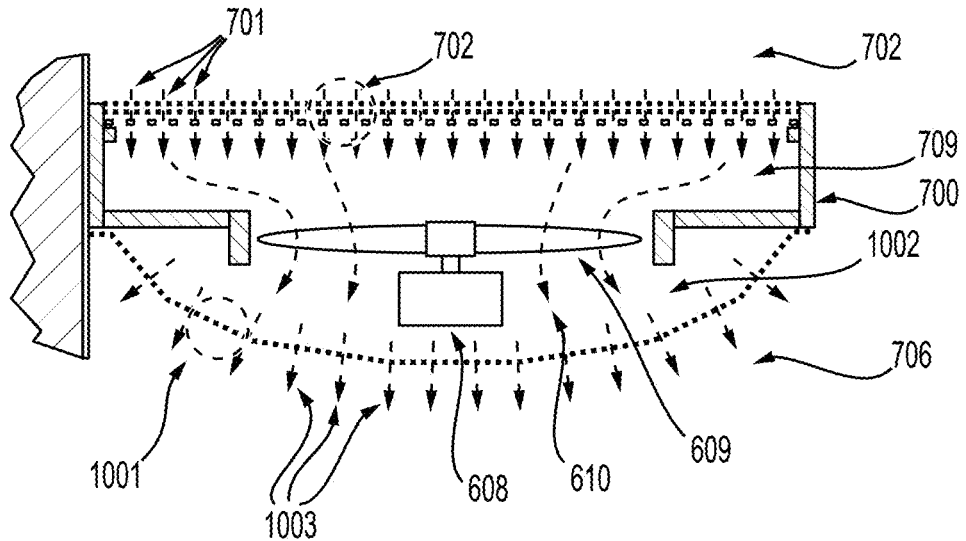
Figure 11:
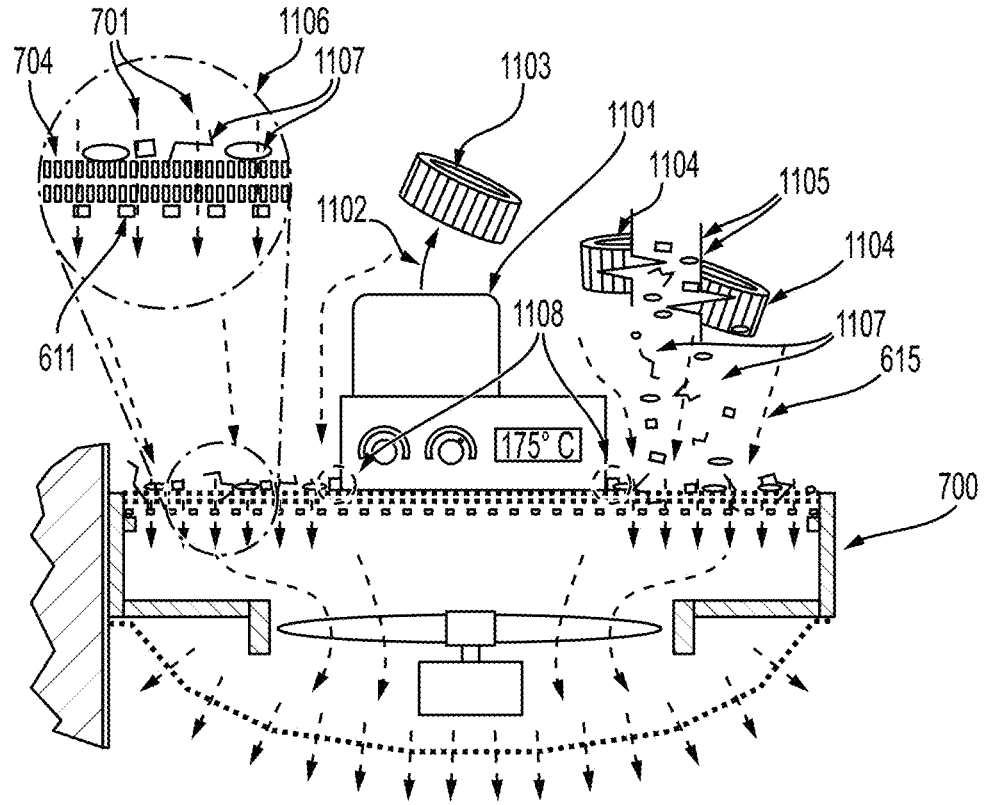
Figure 12:
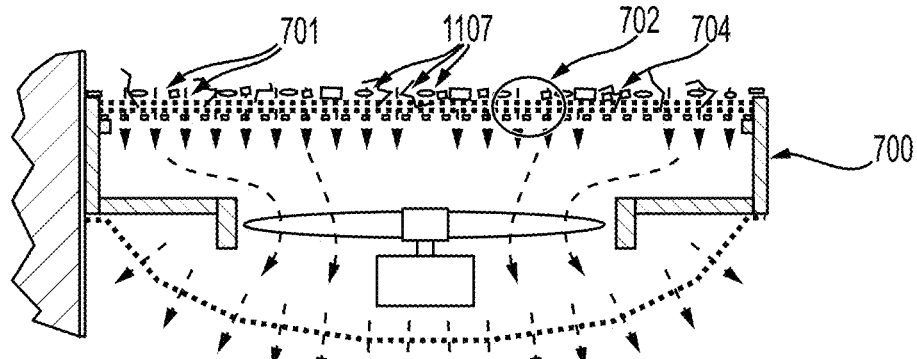
Figure 13:
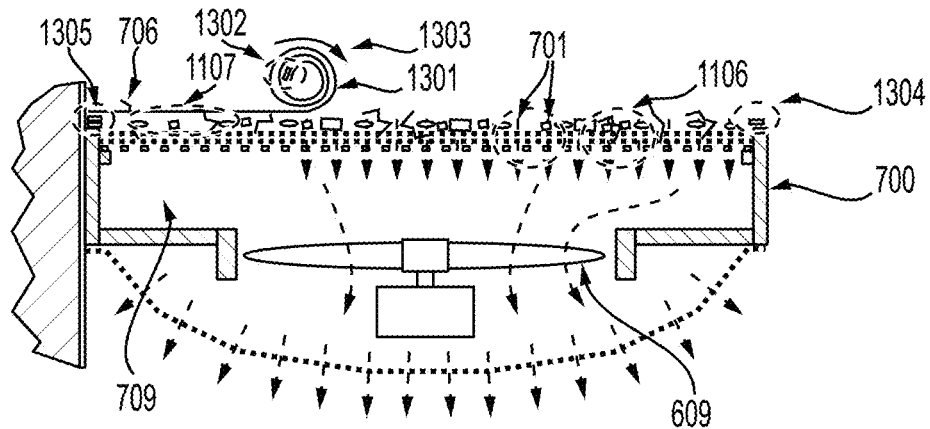
Figure 14:
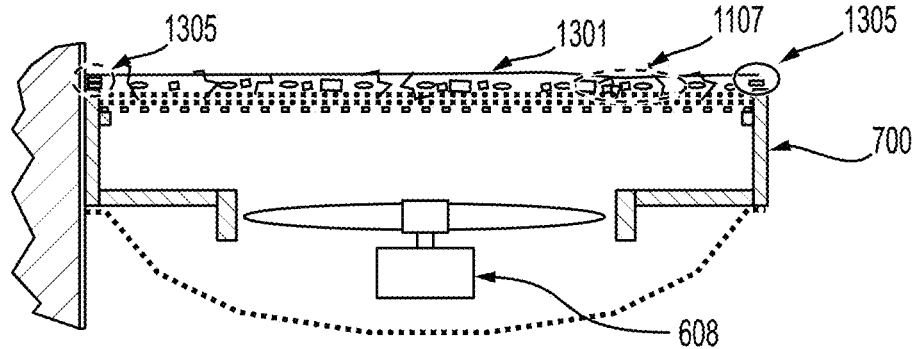
Figure 15:
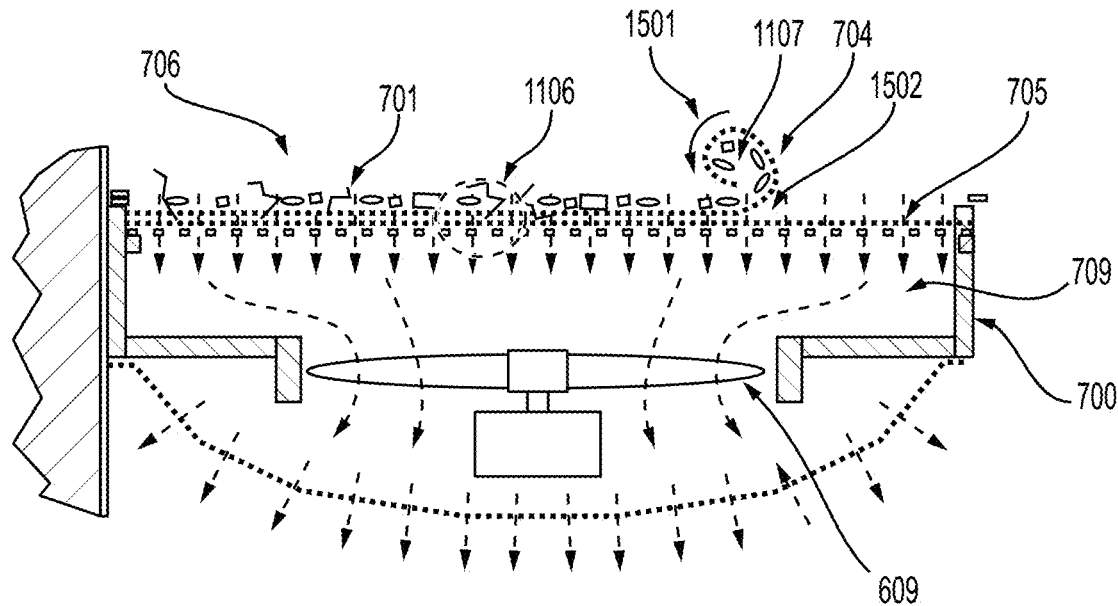
Figure 16:
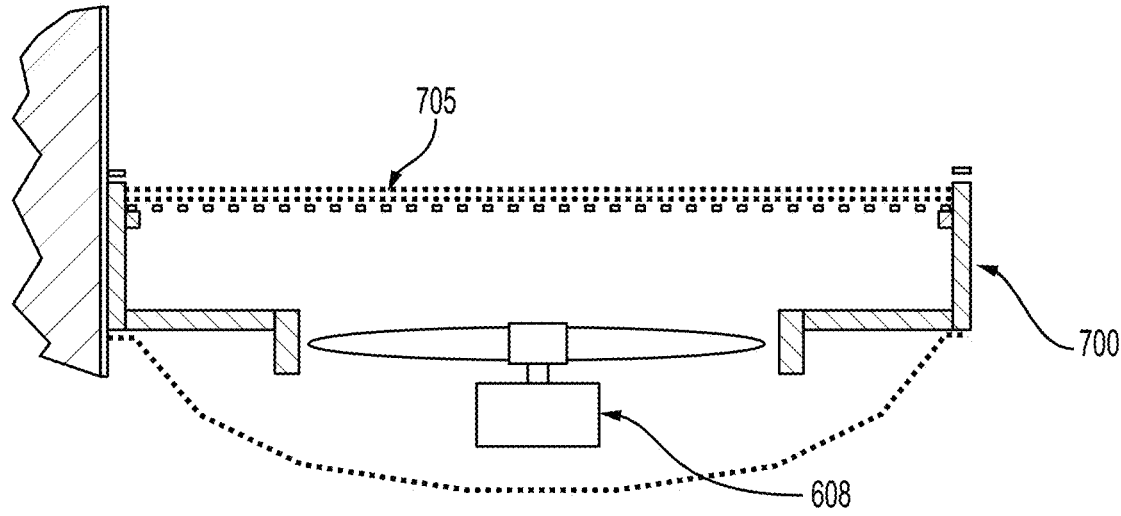
Figure 17:
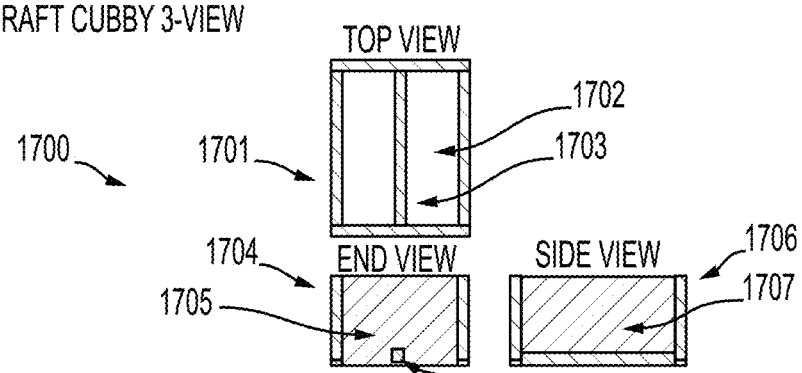
Figure 18:
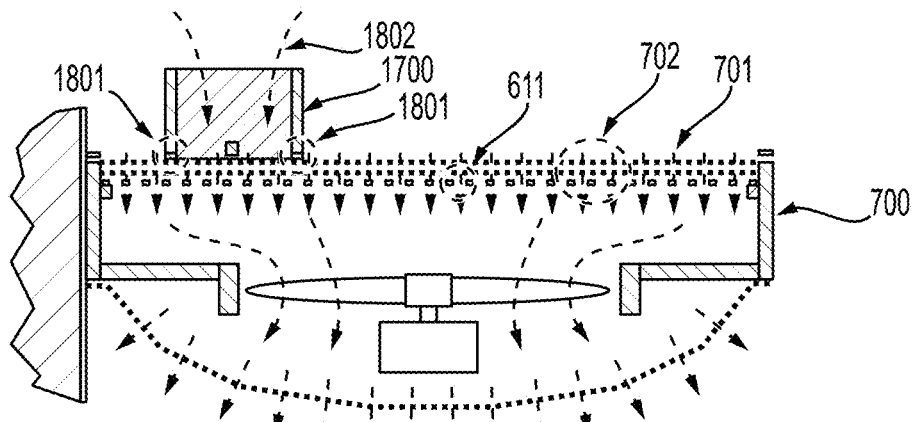
Figure 19:
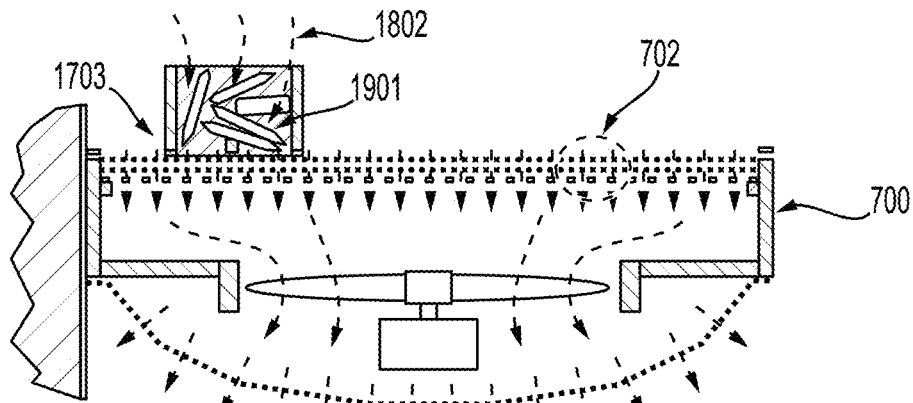
Figure 20:
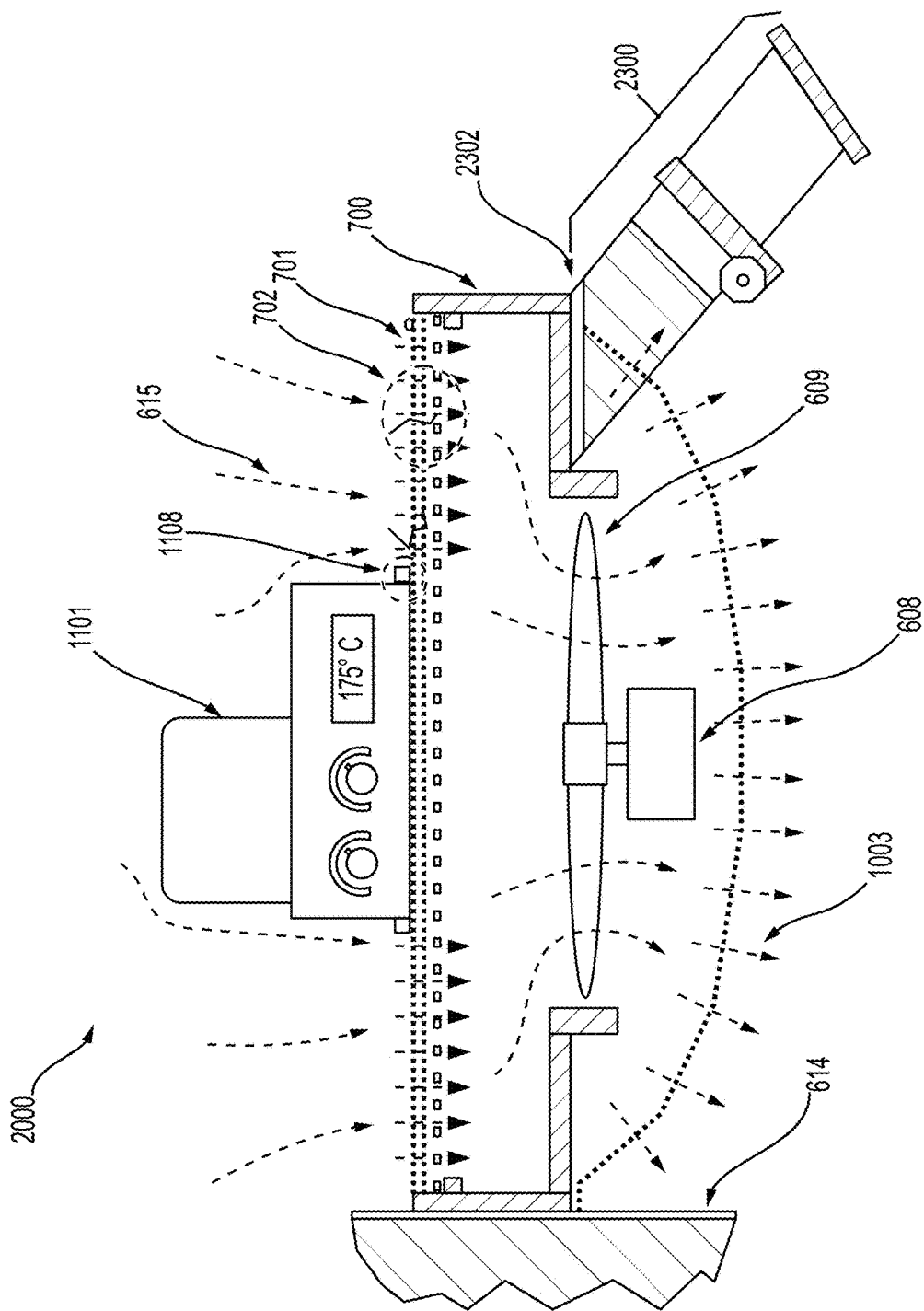
Figure 21A:
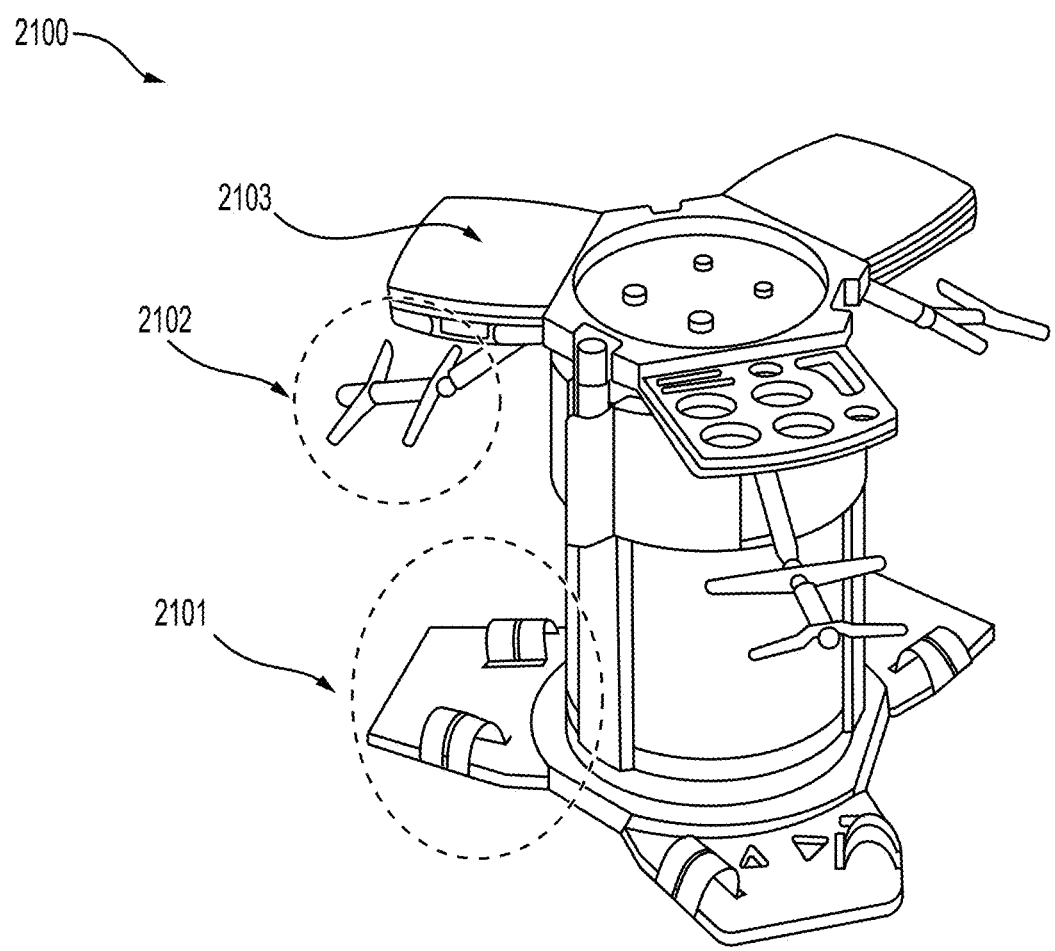
Figure 21C:
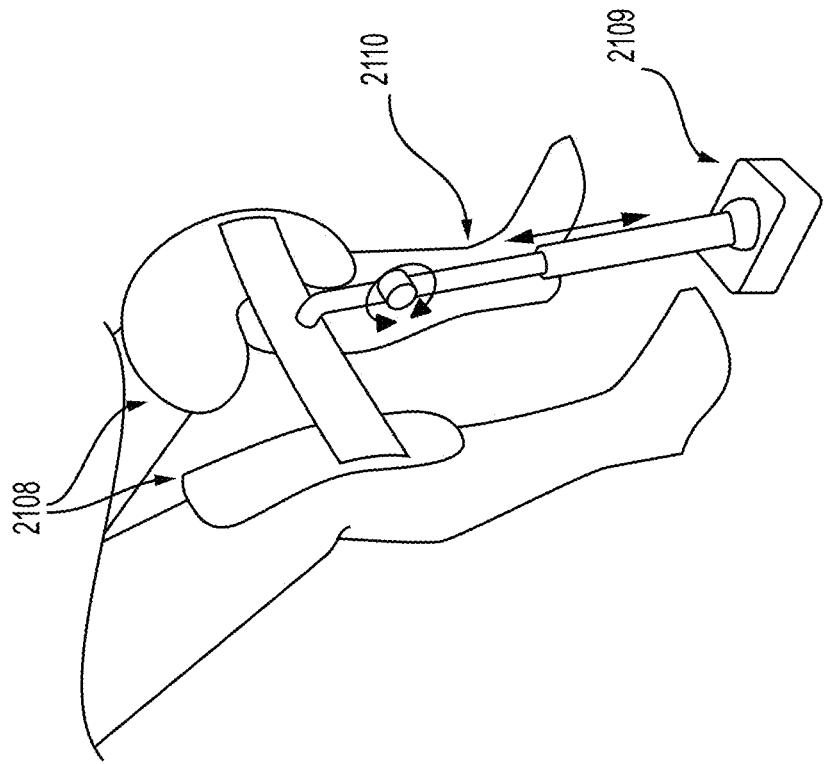
Figure 21B:
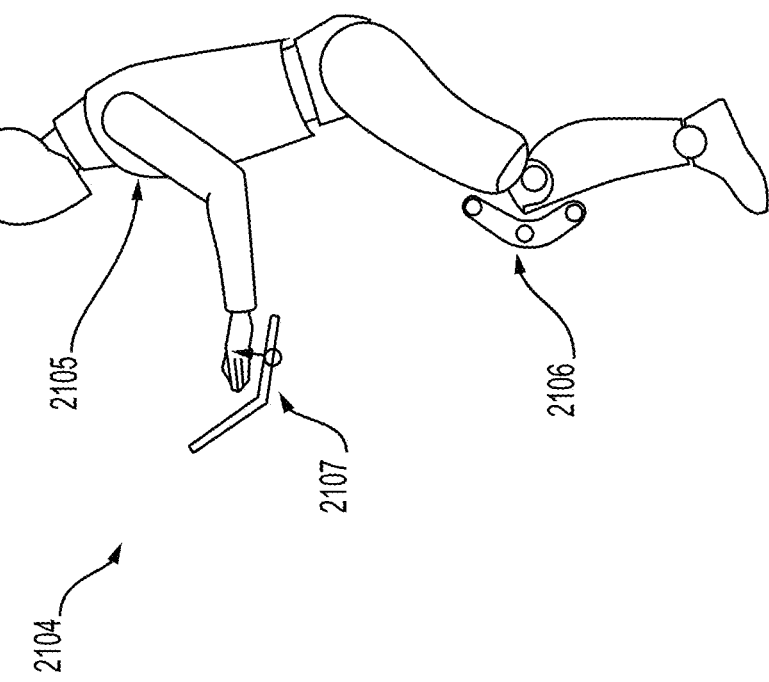
Figure 22A:
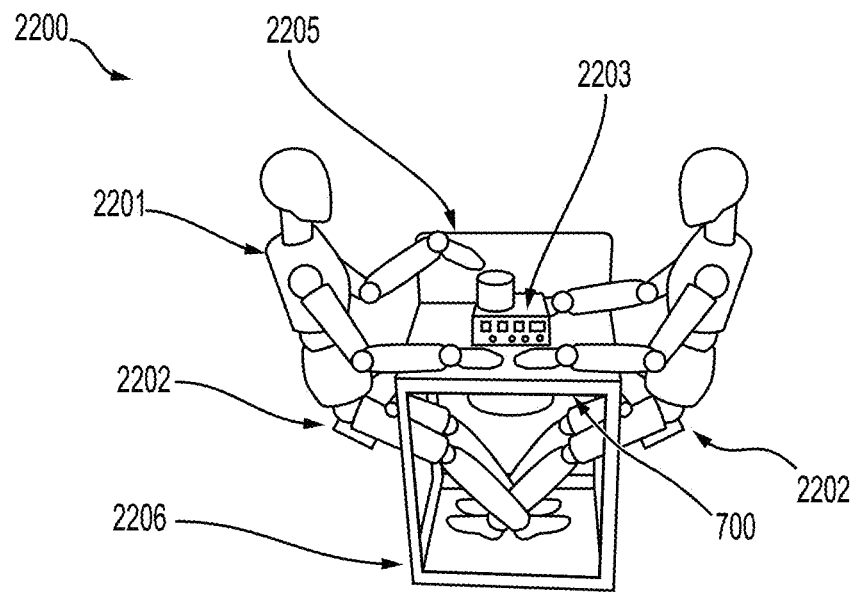
Figure 22B:
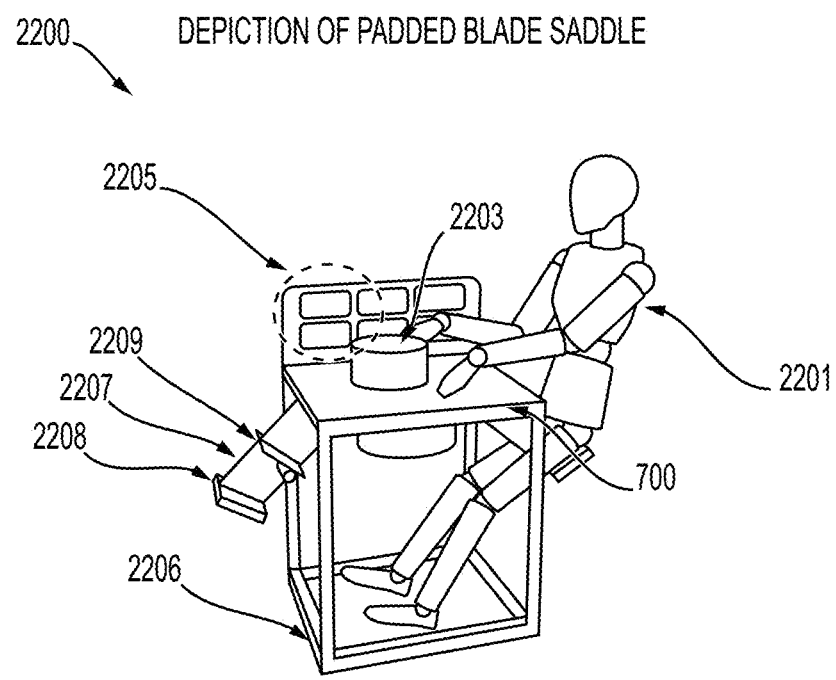
Figure 23A:
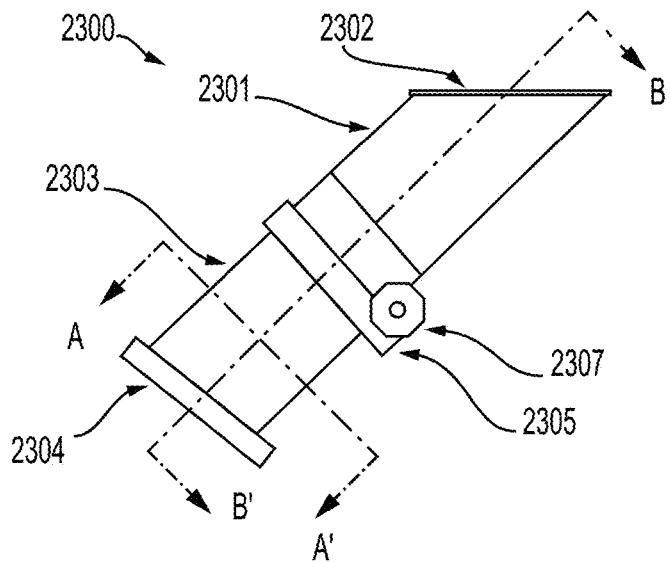
Figure 23B:
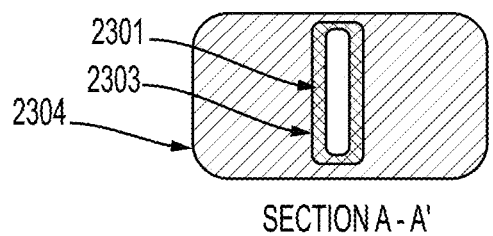
Figure 23C:
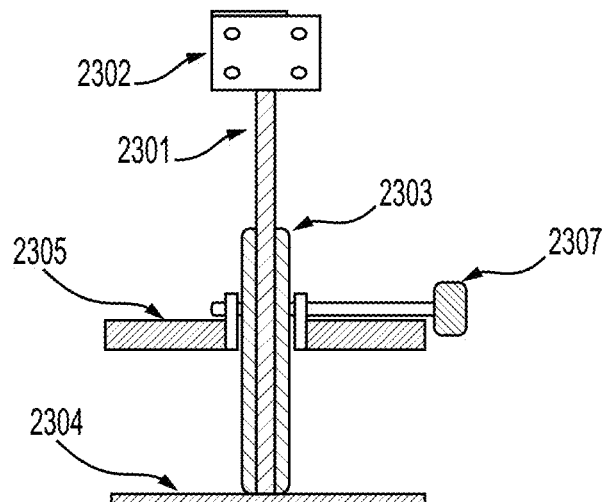
Figure 24:
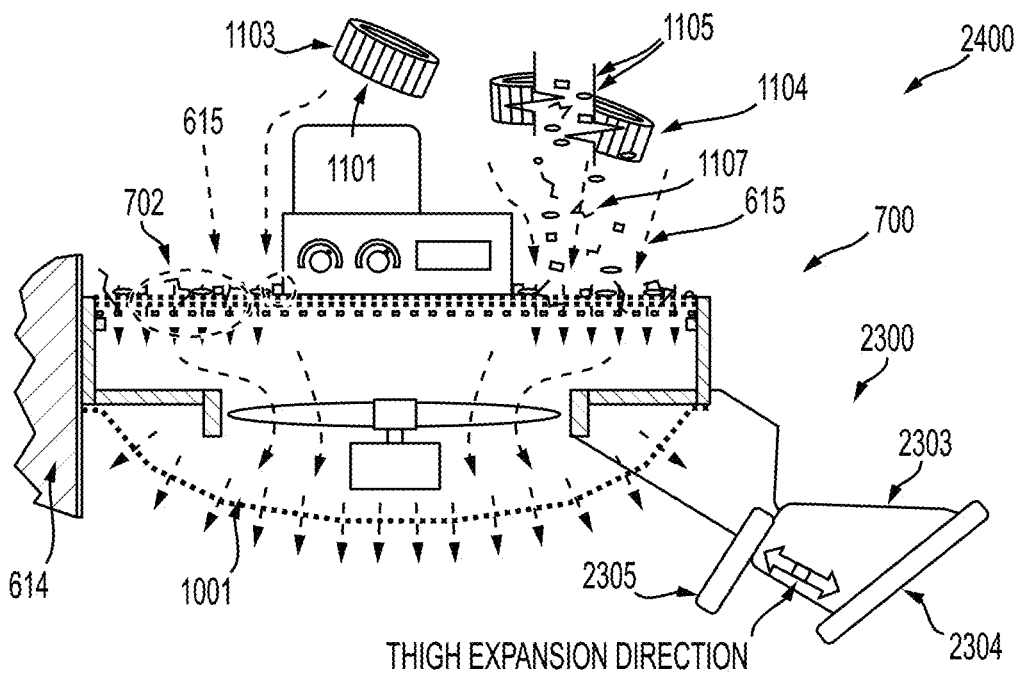
Figure 25:
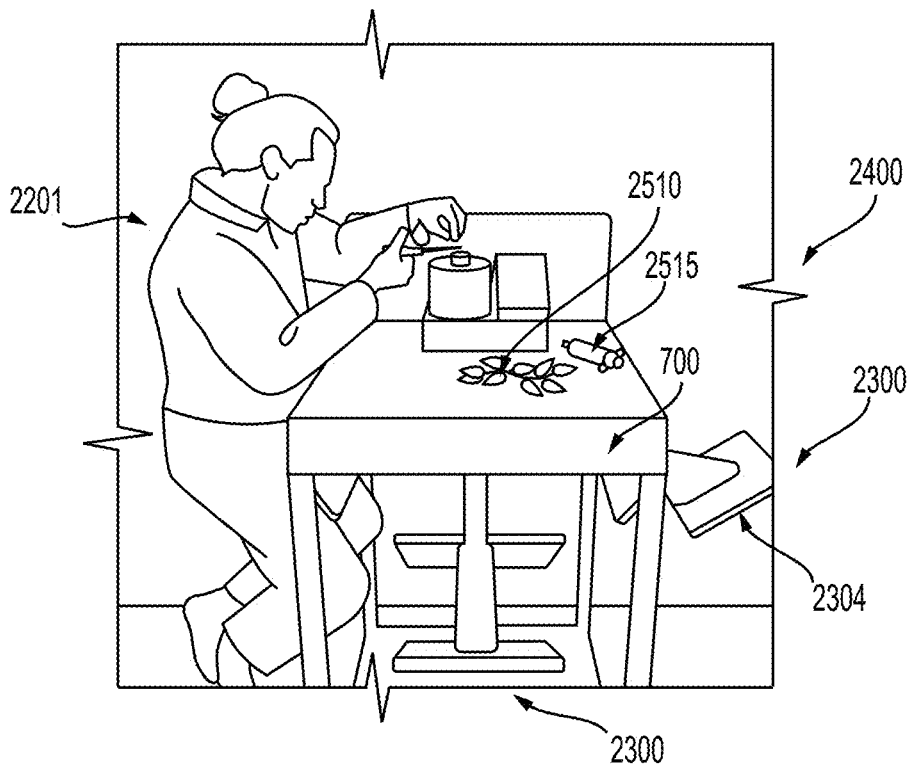

FIG. 9a lists downdraft table specifications, in an embodiment;

FIG. 9b lists downward force versus lift-off distance for various objects;

FIG. 9c lists pressure and electrical power for different flow resistive layers;

FIG. 9d illustrates various objects tested for use with the downdraft table;

FIG. 10 shows a downdraft table with an outflow resistive layer, in an embodiment;

FIG. 11 illustrates the downdraft table of FIG. 10 being used to capture generated debris;

FIG. 12 illustrates the downdraft table of FIG. 10 with a resistive filter layer fully loaded with debris;

FIG. 13 illustrates the downdraft table of FIG. 10 with a covering resistive filter layer having a sealing layer, in an embodiment;

FIG. 14 illustrates the downdraft table of FIG. 10 with debris captured in a power off mode;

FIG. 15 illustrates the downdraft table of FIG. 10 with safe removal of a fouled outer resistive layer in microgravity;

FIG. 16 illustrates the downdraft table of FIG. 10 prepared for laying down a fresh outer resistive filter layer;

FIG. 17 shows three views of a downdraft cubby, in an embodiment;

FIG. 18 shows the downdraft cubby of FIG. 17 installed on the downdraft table of FIG. 10;

FIG. 19 shows the downdraft cubby of FIG. 18 having objects therein;

FIG. 20 shows the microgravity downdraft workstation of FIG. 10 having a padded blade saddle, in an embodiment;

FIG. 21a shows a Skylab space station foot and a thigh restraint microgravity workstation;

FIG. 21b is a side view of a prior art knee pressure grip microgravity restraint concept;

FIG. 21c is a perspective view of the prior art knee pressure grip microgravity restraint concept of FIG. 21b;

FIG. 22a is a perspective view of the microgravity downdraft workstation having a padded blade saddle, in an embodiment;

FIG. 22b is another view of the microgravity downdraft workstation having the padded blade saddle of FIG. 22a;

FIG. 23a is a side view of a padded blade microgravity saddle, in an embodiment;

FIG. 23b is a cross-section view of the padded blade microgravity saddle of FIG. 23a;

FIG. 23c is another cross-section view of the padded blade microgravity saddle of FIG. 23a;

FIG. 24 shows a microgravity environment workstation having a downdraft table and a padded blade microgravity saddle mounted to the downdraft table, in an embodiment; and FIG. 25 is a perspective view of the microgravity environment workstation of FIG. 24 having a plurality of padded blade microgravity saddles, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

The Problem

Astronauts have continuously inhabited the microgravity environment of low-earth orbit aboard the International Space Station (ISS) since October of 2000. Microgravity, for the purposes of this application, is defined as the environmental state in which objects do not fall in any direction relative to their local environment. This environment is experienced as weightlessness and often called zero-gravity even though the gravitational attraction between masses, well known in physics, is always in play anywhere in the universe. Therefore, the term "microgravity" is used in this application to describe environments when the prevailing effect of gravity is too small to be observed.

Figure 1A:
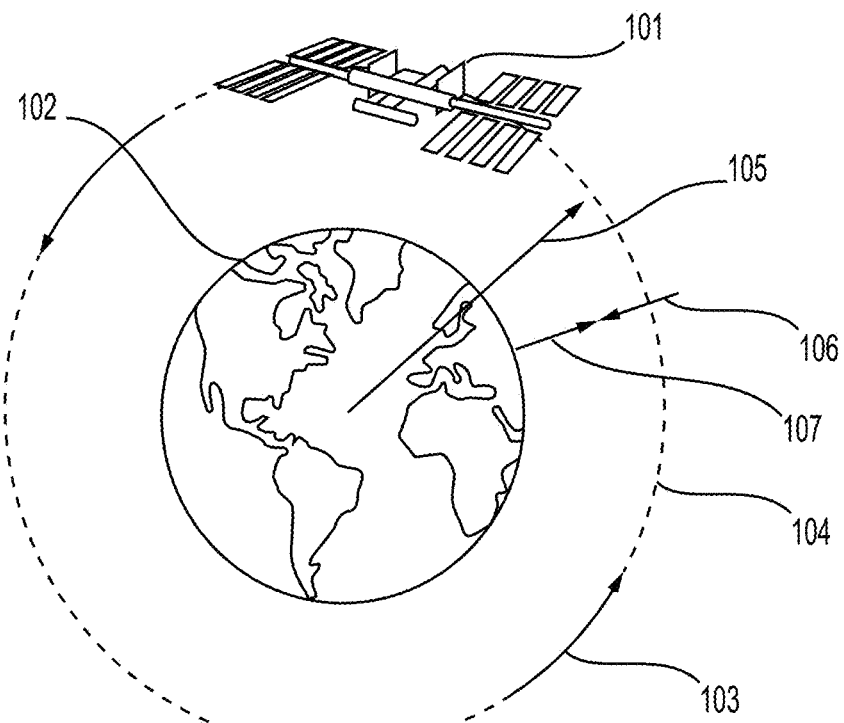
FIG. 1a depicts a spacecraft in orbit around the Earth configured to provide a microgravity environment onboard.
Figure 1B:
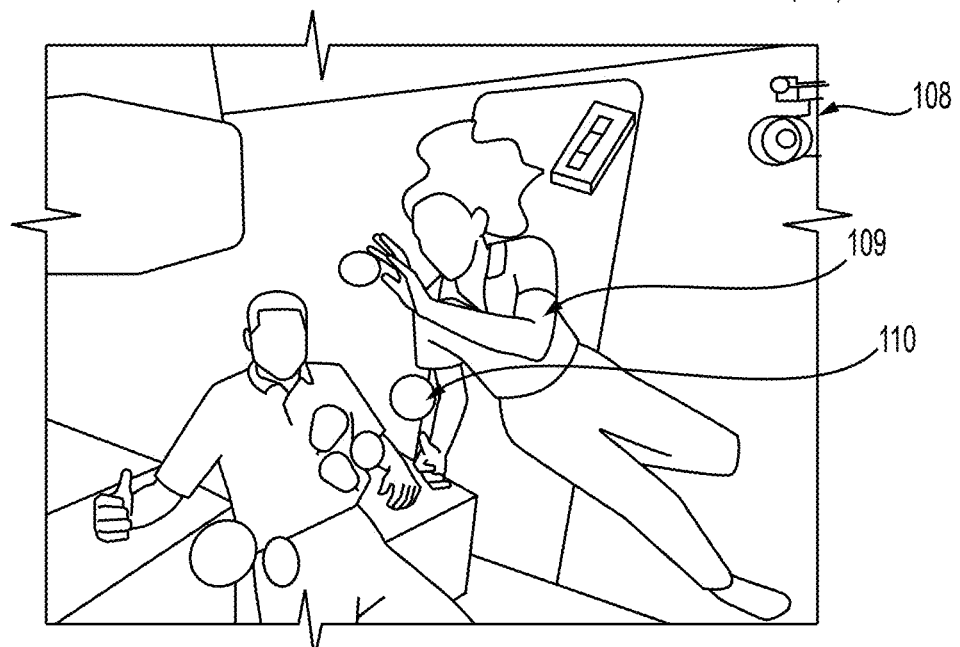
FIG. 1b illustrates a microgravity environment aboard the International Space Station (ISS)

Microgravity exists aboard space stations orbiting the Earth because the centripetal acceleration due to the circular orbit exactly counterbalances the natural gravitational effect arising from the co-attraction of masses. Referring to FIG. 1a, an orbiting object such as the International Space Station (ISS) 101 orbits 103 along a circular path 104 at radius 105 around a large body of mass such as Earth 102. Radius 105 is approximately 6743 Km. The gravitational attraction of Earth 102 is classically expressed as an acceleration 107 of 9.8 meters/second$^2$ aimed outwards from Earth as measured at the surface of the Earth. Because the ISS 101 orbit is positioned further from earth's center of mass than the surface, Earth's acceleration of gravity at the ISS itself is only 8.6 meters/second$^2$. As the ISS 101 orbits 103 along circular path 104 it experiences centripetal acceleration 106 aimed toward the center of rotation. Microgravity on the ISS 101 occurs because its centripetal acceleration 106 exactly counterbalances the acceleration of gravity 107 at its location. Since everything and everyone aboard the ISS 101 is traveling the same circular orbit 104 everything and everyone experiences microgravity. FIG. 1b shows a view of the interior of the ISS 108 in which an astronaut 109 is seen floating in the cabin and attempting to grab other floating objects 110 around her.

While floating in space looks fun, if the astronaut is seriously trying to keep control of many floating objects 110 then the experience can be overwhelming. Additionally, the astronaut 109 cannot control her own position or orientation in the cabin except by hooking a foot under a grab bar.

Accordingly, everything not bolted or tethered to the inside of the ISS 101 is traditionally stowed in tethered bags or clamped or Velcroed to an inside surface of the ISS 101. This poses a long prevailing problem as not everything is convenient to attach Velcro to or tie with a tether. For example, consider screws removed when repairing equipment, pieces of food not stuck to a utensil or a stack of playing cards that would start to float around during a game.

Aboard the ISS, microgravity is a constant experience that has now lasted almost 20 years. Astronauts living aboard the ISS have to attend to objects that may float around them causing constant grabbing of a food packet, tool or piece of clothing. To prevent mental and physical distraction aboard the ISS every individual object must be stowed away or attached to the interior of the ISS. Famously, adhesive spots of Velcro and elastic bands have been used extensively to hold down tools, writing instruments, food packets during mealtime and the multitude of objects of every sort needed during normal life. The present invention, among many other applications, aims to make equipment repair, eating food and playing cards aboard the ISS 101 or any microgravity environment possible.

However, a host of normal human activities are currently simply impossible aboard the ISS. Consider playing a hand of cards. Without a means to hold dealt cards to the table, 52 objects could begin floating about the cabin. Attaching a piece of Velcro to each card would make it impossible to shuffle. Opening a container of small objects would leave one scrambling to re-contain them. Removing more than one screw or part from a piece of equipment under repair leaves one with the time consuming task of restraining or containing each individual part. Some substances such as powders or granules are simply forbidden to handle aboard the ISS for risk not only of them spreading around the interior but also the dangerous possibility of inhaling them with normal medical care simply unavailable.

The list of impractical or dangerous practices aboard the ISS, that are normal on Earth, is formidable and an impairment to performing routine scientific duties and daily activities. Add to this that the astronauts themselves float around unless their shoes are strapped to the deck. This makes grabbing for objects that float away more difficult. More importantly it makes manual tasks requiring fine motor control difficult as the hands cannot be grounded by gravity holding one buttocks to a chair or forearms to a table.

Figure 2A:
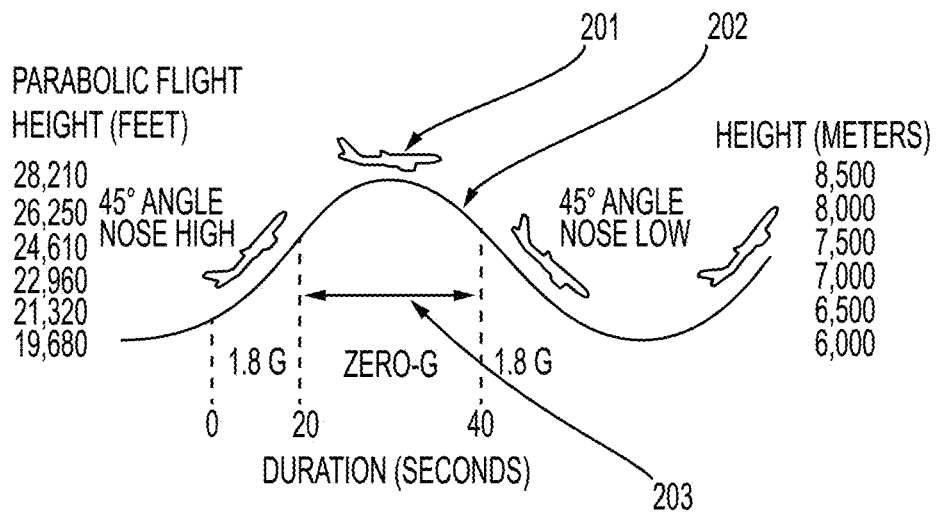
FIG. 2a illustrates how microgravity is achieved through aircraft parabolic flight maneuvers.
Figure 2B:
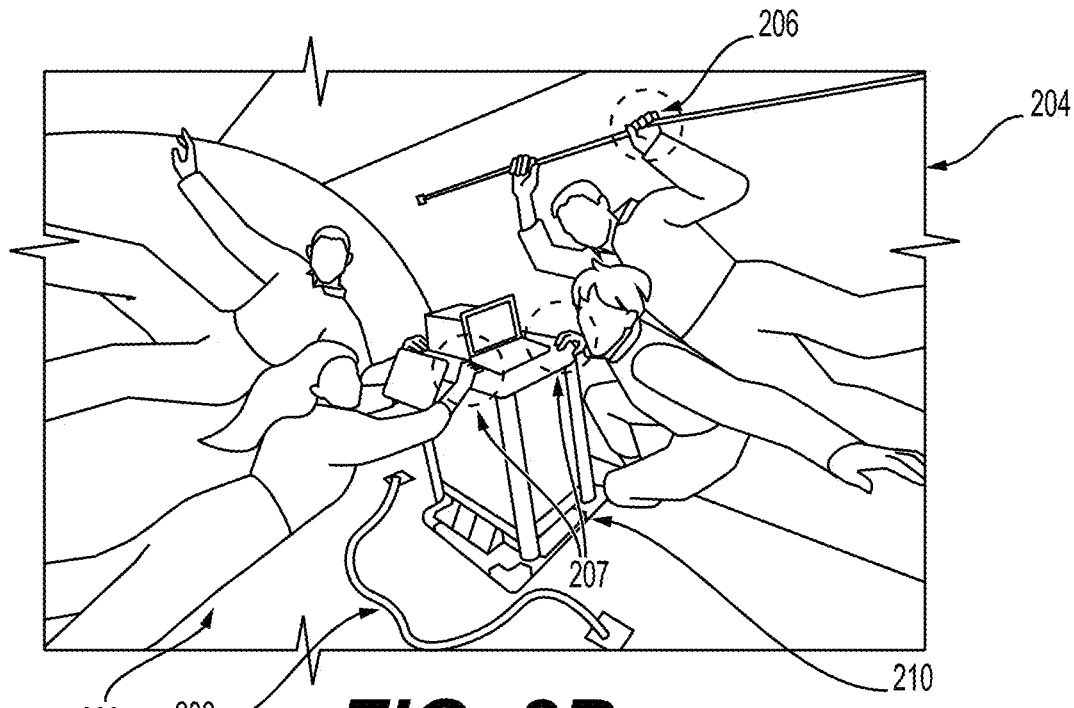
FIG. 2b illustrates a microgravity environment during parabolic flight.

Referring to FIG. 2a, microgravity can also be experienced aboard conventional aircraft 201 performing parabolic flight maneuvers 202 wherein the aircraft is allowed to crest unpowered in its flight path for periods of up to about 20 seconds 203. During this 20 seconds, unrestrained objects and people float freely around the interior of the aircraft. These flights enable tourists to experience weightlessness and researchers use them to validate the performance of equipment destined for use aboard the ISS or other spacecraft. FIG. 2b shows a typical scene 204 of researchers 209 attempting to work on an experiment 210 during one of these zero-g flights. It is difficult to have both hands occupied on the work when the body is otherwise unconstrained. Researchers must hold onto stabilizing straps 206. Much wasted time and effort typically needs to be expended orienting one's body and holding onto equipment with one hand 207 while making adjustments with the other. Floor straps 208 are often fastened over the researchers' calves. Despite the considerable expense of these parabolic flight operations, the ability of the experimenter 209 to operate any experiment in microgravity is being tested more than the experiment 210 itself. Much time is wasted because of the lack of a way to control the researcher's body and floating objects during experimentation.

Figure 3:
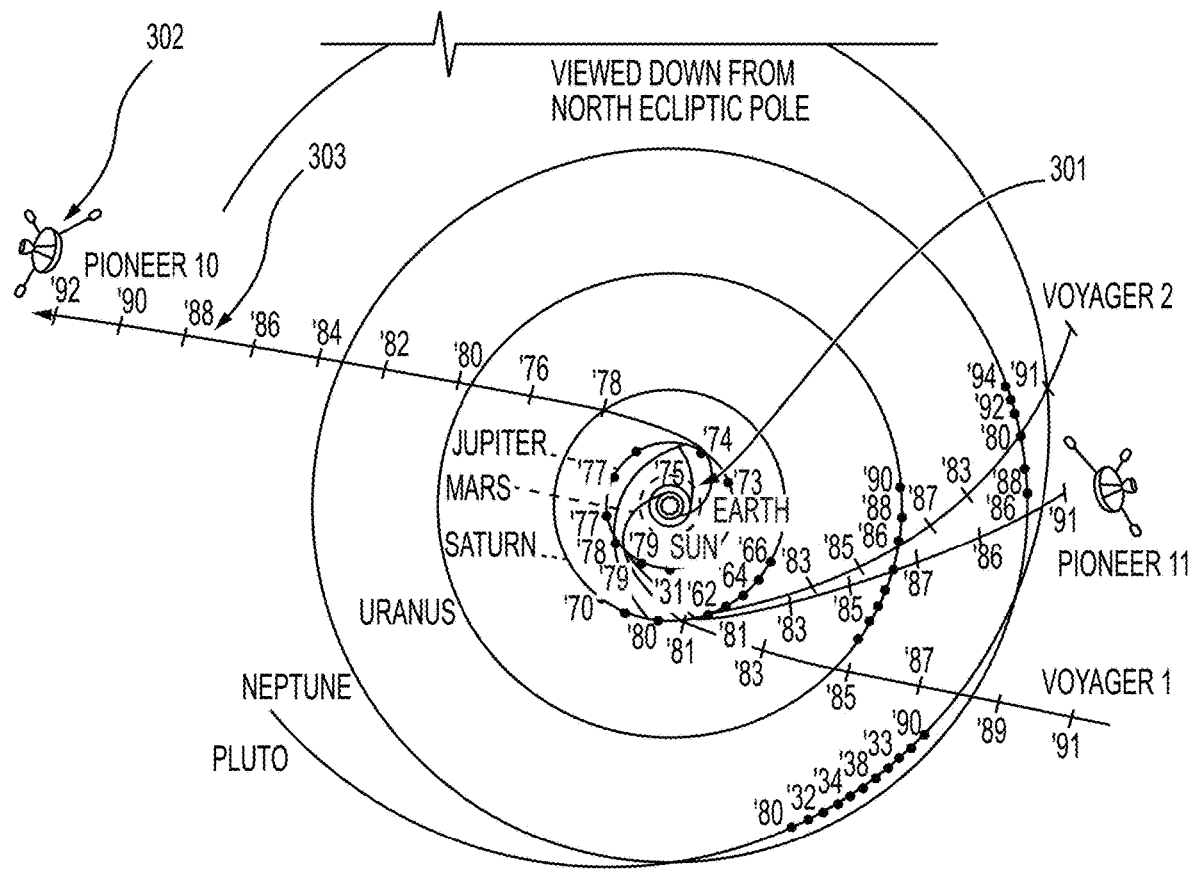
FIG. 3 illustrates exemplary spacecraft trajectories in deep space.

Microgravity also exists in deep space. FIG. 3 shows a view of our solar system and some of our exploration vehicles such as Pioneer-10 302 speeding along a path 303 further and further away from the earth, sun and other planets in our solar system having a gravitational attraction. The force of gravity decreases with the square of the distance away from the gravitational body. Even within the circle 301 that contains the Sun, Earth and Mars the reductions in gravity can be extreme because of the distances. For example, a spacecraft traveling within that circle 301 to Mars by the end of the decade would come to experience gravity at a level less than 1 millionth that on Earth. A spacecraft one day traveling beyond the orbit of Pluto would experience gravity at a level 1 trillionth of that on earth. Like being in orbit or on a parabolic flight aircraft, these deep space environments also need a way to stabilize the human body so it can easily do work and stabilize many parts at once from floating around so that complex tasks can be completed.

Figure 4:
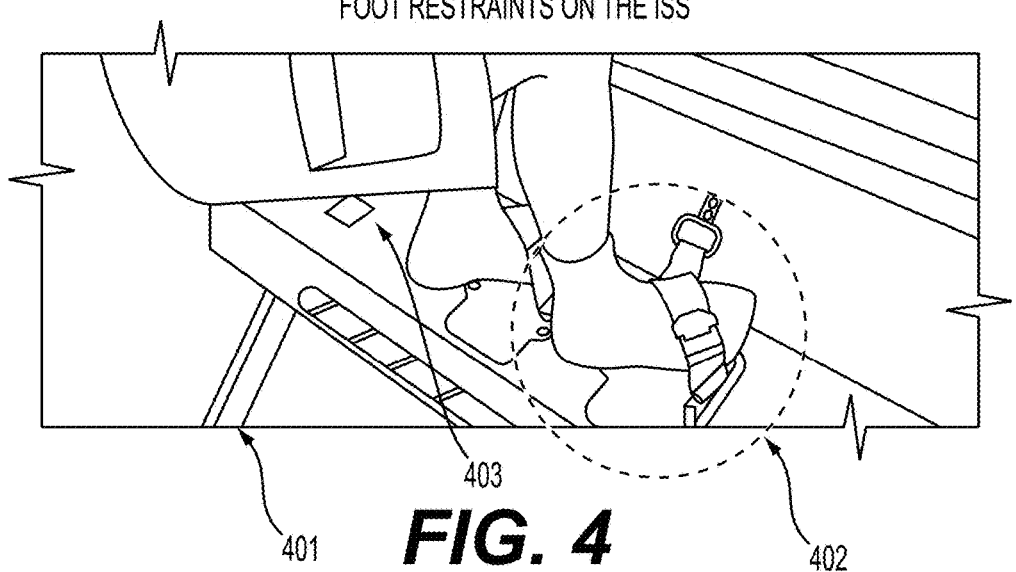
FIG. 4 shows exemplary foot restraints on the ISS.
Figure 5A:
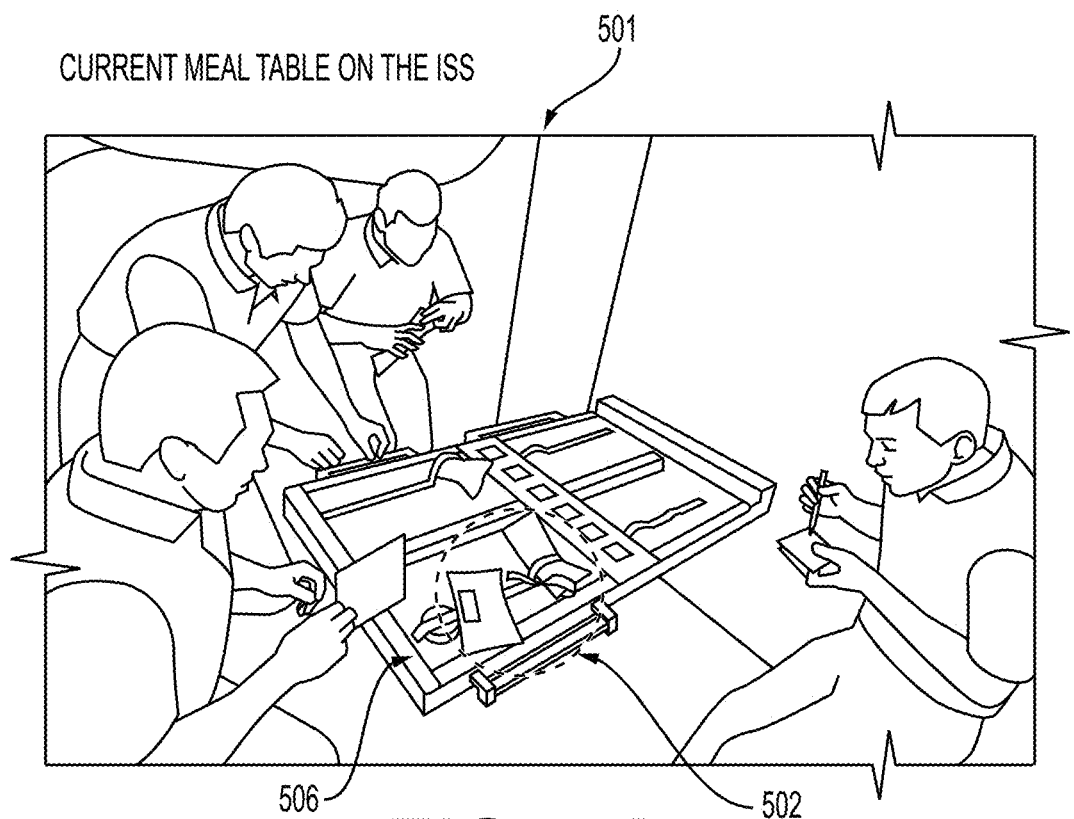
FIG. 5a shows a meal table on the ISS.
Figure 5B:
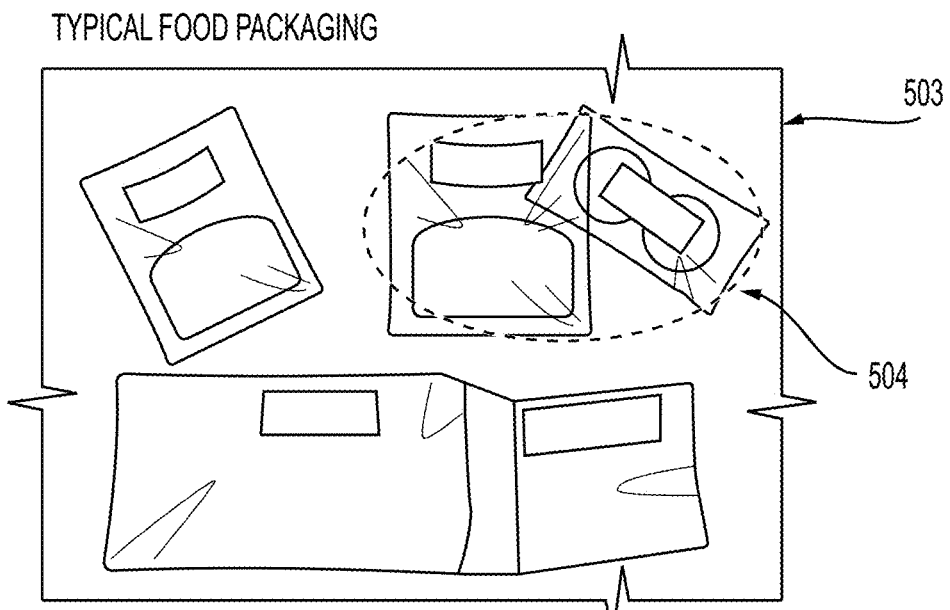
FIG. 5b shows exemplary food packaging for spaceflight missions.

FIG. 4 shows the most common approach currently used to stabilize the body in microgravity. Throughout the work areas of the ISS 401 are located foot straps 402 that the astronaut 403 can use to keep themselves from floating away. When working with their hands, astronauts 403 must often brace their actions through their feet. This happens on an almost continuous basis so that astronauts are known for generating calluses on the tops of their feet from constant use of foot straps 402 like those shown in FIG. 4. FIG. 5a shows a meal table on the ISS. Objects 502 are held to the surface of table by strips of Velcro 506 or by Velcro dots affixed to the bottoms of objects 502. FIG. 5b shows exemplary food packaging for spaceflight missions.

What is needed in microgravity environments is a way to keep unattached objects, liquids, parts, ingredients and particles localized to a workstation desktop and a way for the astronaut to stabilize and orient themselves to the workstation in a way that does not require taking their hands from their work. The invention described in this application is a microgravity workstation combining a microgravity adapted downdraft table with a microgravity stabilizing seating solution.

The Solution: A Microgravity Downdraft Table Plus Microgravity Seating Solution

The solution disclosed in this application is a microgravity workstation that has two parts. The first part (FIG. 7a) is a specially designed downdraft table that attracts and adheres objects to its surface. The second part (FIGS. 23a-c) is a specially designed microgravity seat that allows astronauts seated around the table to immobilize their torso relative to the table. As described in this application, combining the two into a microgravity workstation (FIG. 20, FIG. 22a, and FIG. 22b) will allow astronauts to safely and easily perform a host of activities involving fine motor control hand movements, dealing with small parts, playing games, manipulating implements, cooking from scratch, serving and eating food and performing processes involving potential release of particulates. Up until this invention, all these activities have been impossible, nearly so, or unsafe on platforms like the ISS and future spacecraft having microgravity environments.

Figure 6A:
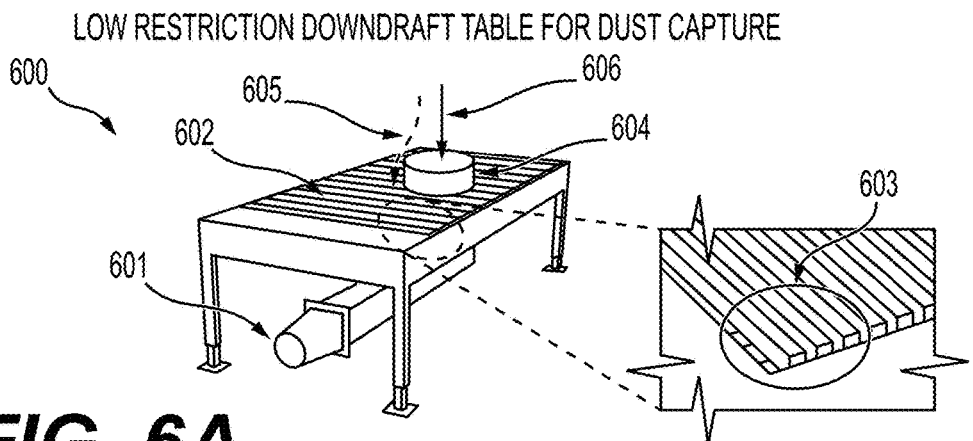
FIG. 6a shows a prior art low restriction downdraft table for dust capture.

Conventional Downdraft Table Technology:

Conventional downdraft tables of various designs are commonly used for capturing chemical fumes and supporting sanding operations generating particulates inside a workshop. FIG. 6a shows a prior art downdraft table 600 made by Axminster tools for use in sanding operations. In this device a shop vacuum unit (not-shown) suctions air from port 601 which is drawn vertically down through the table top 602 that in this case is constructed of parallel slots 603 that allow air to pass freely through. When an object 604 to be sanded is placed on the table 600, conformal air currents 605 pass around the object 604, drawing off any sanding dust emitted into the air around it. This dust is subsequently filtered out of the stream by the shop vacuum (not-shown) connected to port 601. Frictional or air drag forces 606 resulting from the conformal air currents 605 acting on object 604 tend to slightly press object 604 harder against the table top 602 than by gravity alone. As will be shown later from experimental results, these additional downward forces are usually equivalent to less than 5% of the weight of a typical object.

Figure 6B:
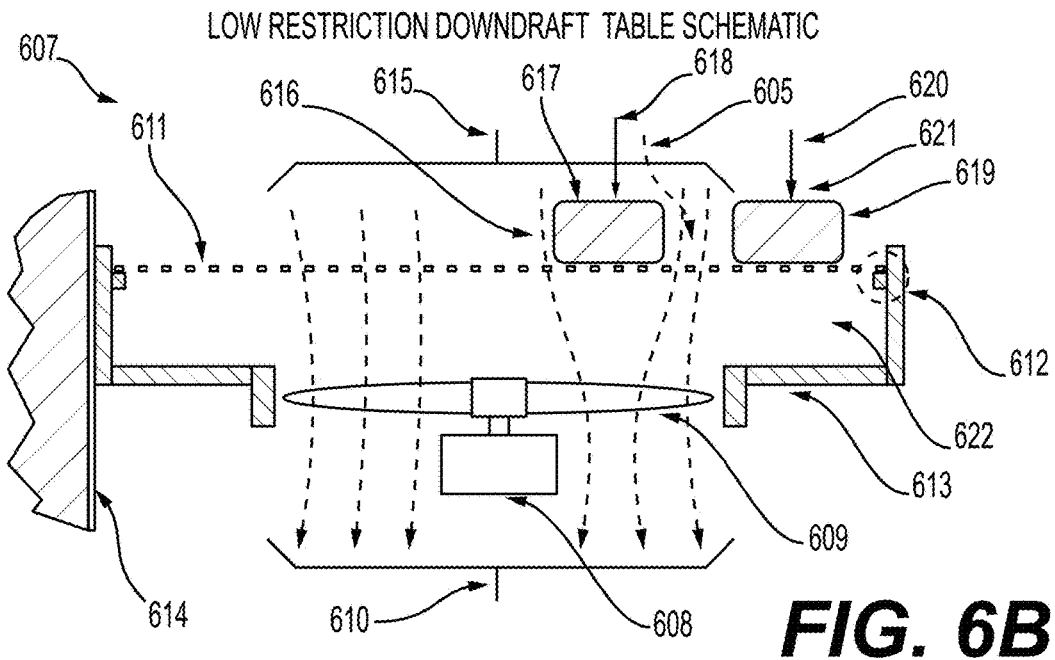
FIG. 6b is a schematic view of a low restriction downdraft table, in an embodiment.

FIG. 6b shows some of the elements of a low restriction downdraft table in an embodiment. In low-restriction downdraft table 607, a fan comprises a fan motor 608 that spins a fan blade 609 to draw air quantity 610 through expanded ferrous steel grate 611 positioned by ledge 612 at an inlet of a plenum chamber 613. Air is exhausted through an outlet of the plenum chamber 613 beneath the fan blade 609, as depicted in FIG. 6b. Plenum chamber 613 which comprises the body of downdraft table 607 is typically bolted to a bulkhead 614 of the habited environment it is part of, such as being attached to one of the inner walls of the ISS. As air flow 615 is drawn down through expanded metal grate 611, parts of the airflow 616 and 605 travel around the edges of block 617 placed on top of expanded metal grate 611. The friction of the airflow 616 and conformal air currents 605 around block 617 slightly pushes it against the top of grate 611 with force 618. Similarly, airflow 616 pass by block 619 and due to their air friction against its sides also causes a force 620 slightly pushing block 619 against grate 611. However, in the shown geometry of a fan blade 609 pulling air through low air restriction grate 611 it can be easily inferred that most of airflow 615 will pass through the center of the grate. Thus, the air forces 618 on block 617 will naturally be larger than the air forces 620 on block 619 that is positioned mostly to the side of air flow 615. Therefore, while the setup in low-restriction downdraft table 607 may assist with holding blocks to a table in microgravity, the holding force is highly variable depending on where the block is placed relative to the largest body of air flow. In aerodynamic theory, the airflow 616 and conformal air currents 605 could be said to be billowing on top of the objects 604, 617 and 619. This billowing may cause a higher pressure 621 on top of the object as in block 619 compared to beneath the object at point 622. While small, because the open grate 611 tends to equalize the pressure 621 and pressure 622, this pressure difference, in addition to surface friction, contributes slightly to the forces 606, 618 and 620 acting on the objects.

Figure 6C:
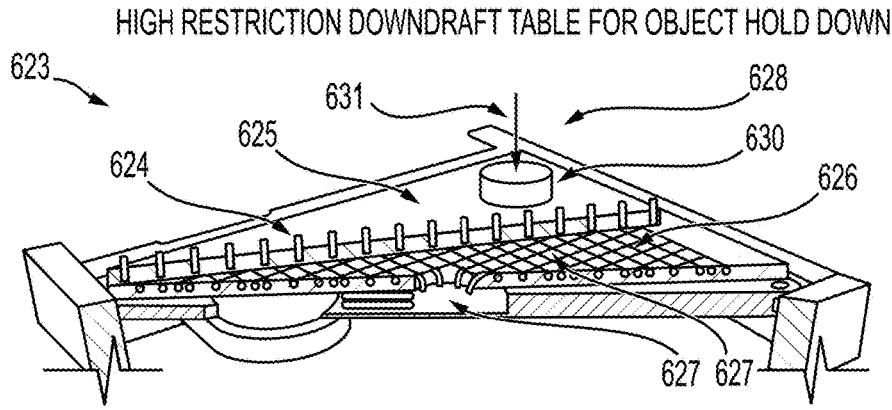
FIG. 6c shows a prior art high restriction downdraft table for holding down objects.

FIG. 6c shows a prior art high restriction downdraft table 623 of a design from a Make Magazine article entitled "ShopBot Desktop Universal Vacuum Hold-down System". In this configuration air 624 is drawn through the open pores of a medium-density fiberboard (MDF) bleeder board 625 that had been shaved on both faces to expose the pores between the wood granules. Suction at port 627 pulls this air 624 through the bleeder board 625 and through cut channels in baseboard 626. The air flow 624 friction going through the bleeder board 625 is much higher than the friction of the air flow 615 going through the open grate 611. Therefore the pressure difference between the air channels of baseboard 626 measured at pressure 629 below the bleeder board is much lower due to the suction at port 627 that the ambient air pressure 628 above the bleeder board. When an object 630 with a substantially flat bottom is placed on top of bleeder board 625 it chokes off the flow 624 through the bleeder board causing the vacuum pressure 629 to act through the pores onto the bottom of object 630. The resulting pressure difference of ambient pressure 628 acting on the top of the object and vacuum pressure 629 acting on the bottom of the object 630 causes the downward force 631 to be relatively large compared to the forces in downdraft tables 607 and 600 for the same air flow. For this reason, high restriction downdraft table 623 is commonly used to hold down plywood to bleeder board work surfaces while it is being routed into shapes commonly used in building furniture. However, the high air restriction configuration 623 is poorly suited for holding down objects in microgravity because the rate of airflow 615 is so low as to affect only flat objects 630 directly touching its surface. The use of wood-based MDF fiberboard in spacecraft would also be impractical. The high restriction downdraft table 623 would also not be used because its surface could be loaded up with debris sucked and filtered from the surrounding air. If the suction was ever turned off, the MDF would release the debris that would then float in a microgravity induced airborne cloud back into the spacecraft cabin. For these reasons a particular inventive design of a downdraft table is required for use in microgravity space environments.

Figure 7:
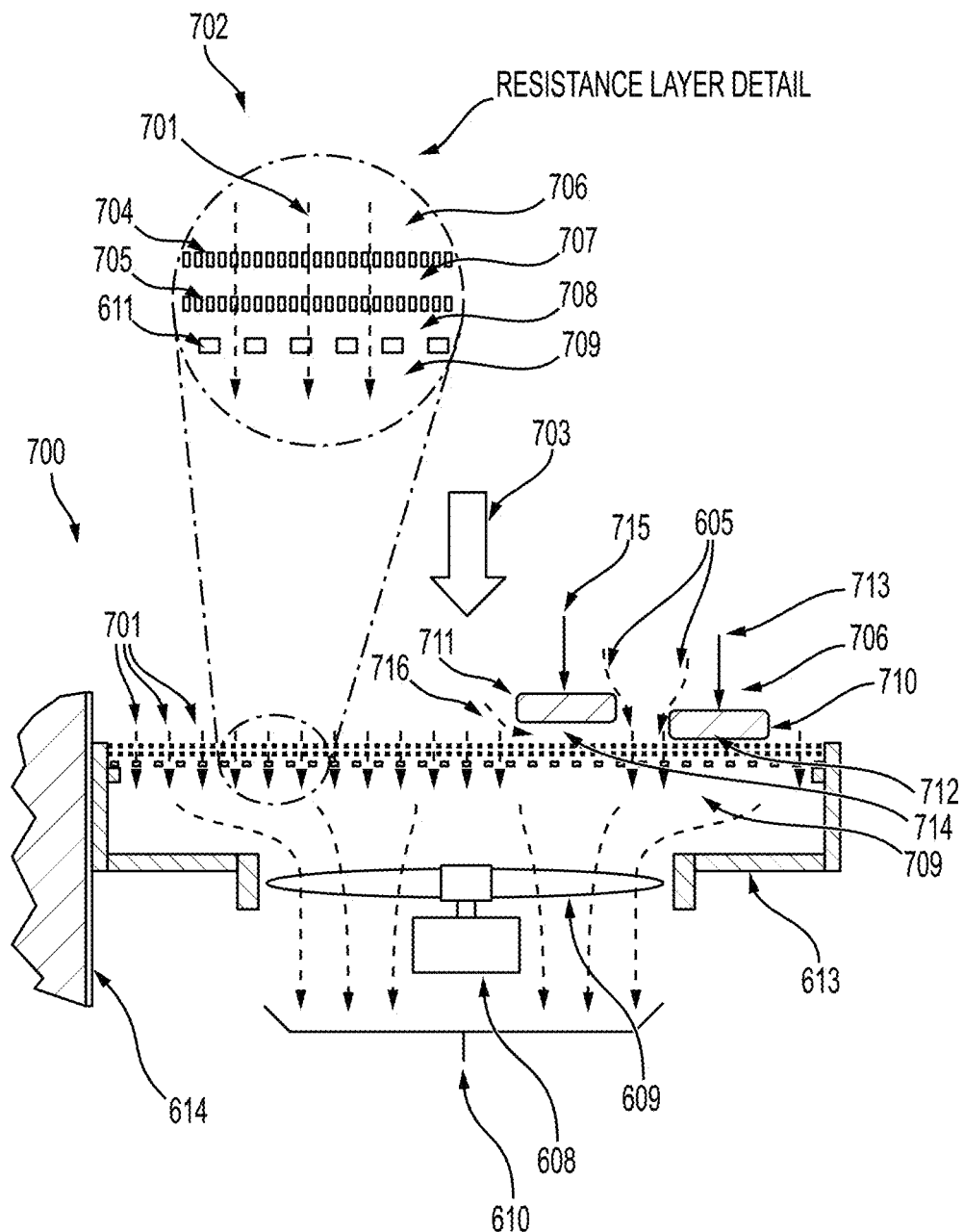
FIG. 7 shows a downdraft table with fabric resistive layers, in an embodiment.

The Downdraft Table of this Invention:

The downdraft table of this invention is designed to pull airborne floating debris to its surface and hold larger objects in microgravity with features that ensure its safe and utilitarian use. The inventive downdraft table is shown in FIG. 7 in its most basic form and primarily differs from the previous downdraft tables of FIGS. 6a, 6b and 6c in that it incorporates two fabric flow resistive layers into its top working surface.

The functions of these layers and other innovations in the downdraft table portion of this invention include the following:

Filtering overall cabin air drawn through the unit by using air filtration media as the air restriction media.

Drawing down crumbs and miscellaneous objects floating above the table.

Adhering objects to the table surface via air flowing around their edges.

Adhering objects to the table via static air pressure difference above and below the object.

Layering two layers of air restriction filter media such that the outer layer can be rolled up and discarded when it becomes soiled or layden with particles without breaking the pressure differential that holds them to the surface nor leaving the airflow unfiltered.

Ability to seal off the top surface by unrolling a self-adhering non-porous layer over the top filter layer such that blower power can be turned off, the airflow stopped, yet formerly captured particles remain captured.

Ability to remove the sealing layer by rolling back without losing adhesion of formally captured particles to the top air restriction filter layer.

Ability to use a high-vacuum hand vacuum to remove excess particles from any of the air restriction layers while the downdraft table is operating and continuing to capture particles on its surface.

A low air restriction ferrous base screen that allows objects and resistive films to be adhered to the downdraft table surface with magnets.

Vacuum blower features: Use of a large diameter axial ducted blower fan to provide a downdraft table vacuum without excessive noise or power drain. (Squirrel cage centrifugal fan may also be used)

Use of an additional air restrictive layer in the blower exit stream to dissipate the airflow over a large surface thus reducing its exit velocity that otherwise might cause harm by blowing things around in the cabin's microgravity environment.

The use of a cubby frame that magnetically attaches to the top of the downdraft table and serves to store and restrain multiple stacked objects from floating away.

The use of deployable side walls increases the effective height and strength of a table's downdraft zone.

These advantages will be described in detail in the balance of this detailed description.

FIG. 7 shows the microgravity workstation's fundamental downdraft table components. As in FIG. 6b, plenum chamber 613 comprises the body of downdraft table 700 that is bolted to an interior bulkhead 614 of a spacecraft that provides a microgravity environment. Items enumerated with like numerals are the same or similar and their description may not be repeated accordingly. Fan motor 608 rotates fan blade 609 to draw air 610 into the inlet of the plenum 613 which is refreshed by air currents 701 passing equally through every part of the downdraft table resistive layers 702 (see resistive layer detail in FIG. 7) resulting in an overall downward air velocity 703 entering the inlet of table 700. The velocity 703 is typically 0.5 meter/second towards the center of the table although it might be as small as 0.1 meter/second and as high as 1.5 meter/second. The velocity of air currents 701 are approximately the same as the overall air velocity 703 unless a substantial portion of the downdraft covering layers 702 is blocked by objects such as objects 710 and 711 in which case the air current 701 velocity may be higher than overall downward air velocity 703. Note that incoming air velocity 703 is actually a diffuse array of incoming velocity vectors as the downdraft table surface 702 draws air from the cabin environment. Toward the center of the table, the incoming air velocity 703 is substantially vertical and toward the edges of the table it angles in as air is pulled over the edge of the table. The downdraft table resistive layers 702 comprise the top of the downdraft table and it may be approximately 70 cm on a side with an area of approximately 0.5 square meters in a typical spacecraft installation.

Referring to the resistive layer detail of FIG. 7, air currents 701 pass downward through an outer resistive filter layer 704 then through an inner resistive filter layer 705, then through expanded metal grate 611. As the air currents 701 pass through the resistive filter layers 704 and 705, a pressure drop is created. This is analogous to the electrical voltage drop when electrical currents pass through electric resistors. Air 610 is then exhausted through the outlet of plenum 613 via the fan blade 609.

For the purpose of the following descriptions and calculations, pressure 706 represents deviation from standard environmental atmospheric pressure. Atmospheric pressure in a spacecraft may vary but is often set at 14.7 psia, which is the same as earth sea level. In the metric system is equivalent to 101,353 pascals where 1 pascal is equivalent to a pressure of 0.0102 grams/cm$^2$. Pressure 706 is designated in this application as the local deviation from atmospheric pressure and since it clearly is positioned on the outside of the invention in local atmospheric pressure it is herein designated as 0 pascals for the purposes of calculations.

Again referring to the resistive layer detail of FIG. 7, as air currents 701 pass through the outer resistive filter 704 then through viscous friction the pressure is reduced to pressure 707. In embodiments, the resistive filter layers 704, 705 are both made from polyester filtration media cloth designated as Merv 13 effectiveness. The Merv designation refers to the average fineness of filtration where higher numbers indicate finer filtration. While the stated pressures in this disclosure refer to Merv 13 filter material, any porous material layer made from any construction with any Merv level can be used for resistive layers 704 and 705 depending on application-specific design requirements. Using the stated Merv 13 material, when air currents 701 collectively move at a velocity of 0.5 meters/second, then pressure 707 will be measured as −11 Pascals, which is often referred to as a pressure drop. As the air currents 701 further travel through the inner resistive layer 705 there will be an additional −11 Pascal pressure drop leading to pressure 708 being read out as −22 Pascals. Conversely, when air currents 701 pass through expanded metal open grate 611 there will be essentially zero resistance to air currents 701 and therefore pressure 709 is measured the same as pressure 708 at −22 Pascals. Accordingly, when air currents 701 pass through the specified stack of two resistive layers and one open grate 702, then the pressure inside the plenum body 613 of the downdraft table 700 is −22 Pascals across the entirety of the bottom side of resistive layers 702 inside plenum housing 613. Because the pressure 709 is constant across the entirety of the bottom of resistive layers 702, then everywhere the top side of resistive layers 702 is equal to the ambient pressure 706 of 0 Pascals then the air flow currents 701 will be of constant velocity and suction ability. Effectively, the resistive layers 702 make any part of the table 700's surface perform the same in suction ability, unlike the case in the low-restriction downdraft tables 600 and 607 wherein the amount of suction varies from center to edge.

In FIG. 7, air-impermeable object 710 is shown spaced immediately on top of the air resistive stack 702. In this position air flow currents 701 are blocked off and have zero velocity below object 710. With no air currents 701 flowing through 702 there will be no resistive pressure drops or difference across 702 under object 710. Accordingly, if the pressure 709 in plenum 613 is −22 Pascals, then pressure 712 right under object 710 will also be −22 pascals. Since the pressure 706 above object 710 is 0 Pascals then the relative air pressure difference pushing object 710 down is 22 Pascals. To turn this into grams we multiply the bottom surface area of the object 710 times the Pascal pressure equivalent. For example, if object 710 is a box of playing cards, its dimensions are 6.5 cm by 9 cm creating a bottom surface area of 58.5 cm$^2$. Accordingly, the force 713 pressing object 710 down would be 58.5 cm$^2$×22 Pascals×0.0102 grams/cm$^2$=13.1 grams. FIG. 8c shows an experimental apparatus that was used to measure this value and specifications for the table are listed in FIG. 9a. Results are shown in FIG. 9b in the line labeled "Playing card box 6.5×9 cm$^2$ filter". For technical reasons it is difficult to measure the surface attraction force of object 710 hanging from threads without pulling it slightly above the surface. Accordingly, at approximately 2 mm above the surface, the table in FIG. 9b shows the recorded attraction force as 8 grams which, while less than the 13.1 grams predicted, was within normal experimental error considering leakage air 716 was likely diminishing the vacuum. Further results showed the force 713 rapidly diminished as the box of cards was lifted above the surface yet still being meaningful in the role of returning a floating object to the surface. In FIG. 7 several factors can be seen in play as another exemplary object 711 is shown lifted further above the surface. First, the downward attractive force rapidly diminishes because of leakage air 716 under the object yet the conformal air currents 605 continue to press the object toward the surface.

Looking at the data in FIG. 9b it can be generally said that objects 710 with a flat bottom surface stick to the surface 702 with relatively high attachment forces while objects with irregular slight profiles like a pair of scissors have small attachment forces. However, the flow of air 701 at 50 cm/second was sufficient to move all objects toward the surface even when spaced 5 cm away. Accordingly, the invention has been experimentally shown to be useful in "keeping objects where they are put" which is a frequently underappreciated virtue of normal gravity in that it keeps our lives organized and familiar objects at hand. The microgravity workstation is configured to bring that convenience to microgravity environments as well.

Figure 8A:
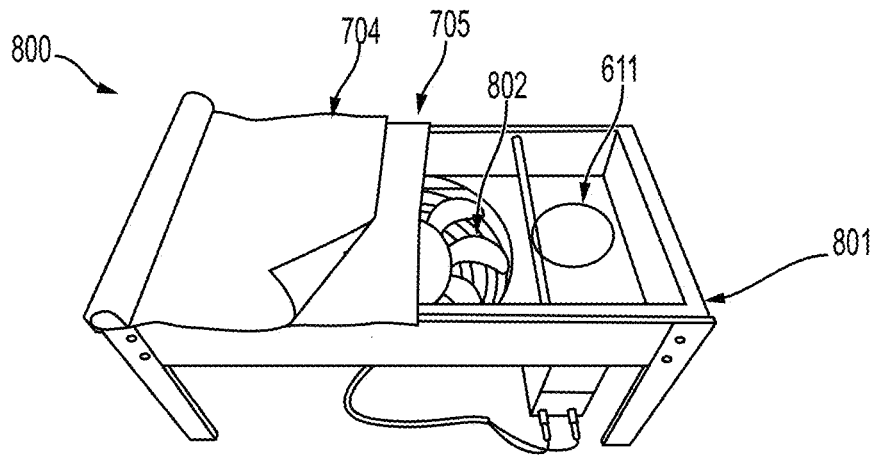
FIG. 8a is a perspective view of a downdraft table with resistive layers pulled back, in an embodiment.
Figure 8B:
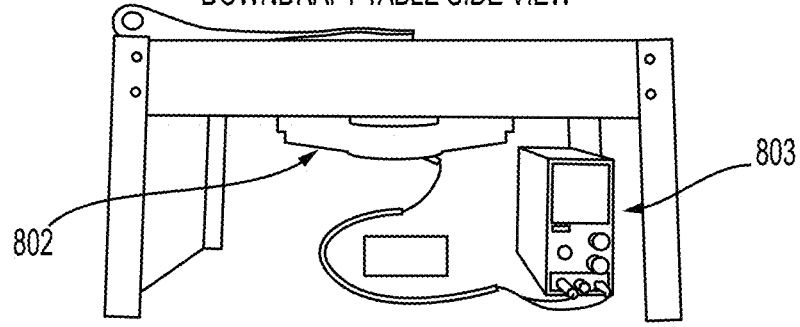
Figure 8C:
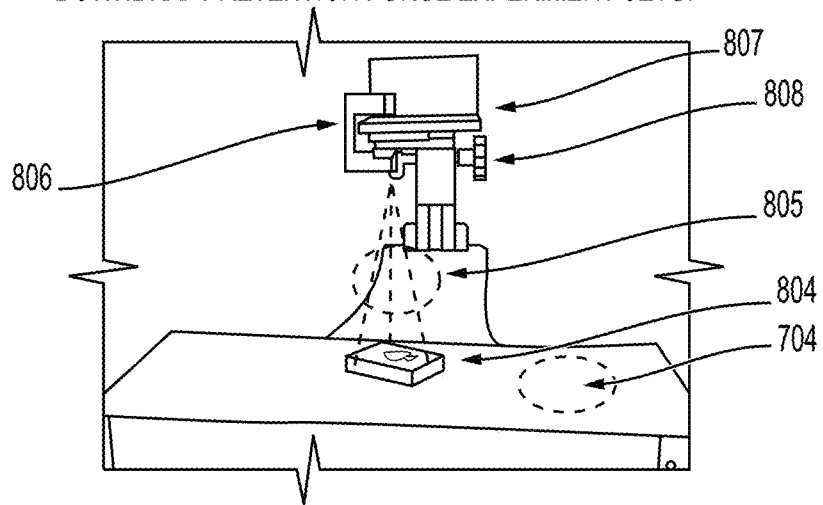
FIG. 8c shows a retention force experiment setup.

FIG. 8a shows a perspective view of a downdraft table 800 with resistive layers 702 pulled back. The table's plenum chamber 801 is covered with low restriction grate 611 made from steel mesh and a top view of DC suction fan 802. Outer resistive layer 704 is pulled back to reveal inner resistive layer 705 which is pulled back to show low restriction grate 611. FIG. 8b shows a side view of downdraft table 800 and shows the variable voltage DC power supply 803 that is used to power the extraction fan 802 at different speeds. FIG. 8c shows the downdraft retention force experimental setup that was used to collect the data presented in FIG. 9b and FIG. 9c. FIG. 9d illustrates various objects tested for use with the downdraft table. An object 804 is suspended above the outer resistive surface 704 by a lightweight harness 805 made of thread to a "C" adaptor 806 that couples the tension on the harness 805 to the surface of sensitive electronic scale 807. In operation, with the DC fan 802 turned off and the object 804 lifted slightly above outer resistive layer 704, the electronic scale 807 is zeroed by pressing its "tare" button. In this zeroed state, the DC fan 802 is turned back on at a voltage that causes the velocity of air 701 through the resistive layers 702 to be 50 cm/second. Then the height adjustment knob 808 is used to position the object 804 at various levels above the resistive layer 702 that are listed in the table of FIG. 9b with an object downward force at 50 cm/sec resistance media inflow velocity. FIG. 9b also shows the downward force 715 according to different heights above the resistive surface 702.

FIG. 10 shows a downdraft table 700 with outflow resistive layer 1001 around the outlet of plenum 613 that is made of filtration materials similar to resistive layers 704 and 705. In this embodiment, air flow 701 is drawn through resistive layers 702 by fan motor 608 driving fan blade 609 and pressing air quantity 610 through outflow resistive layer 1001, wherein the flow emerges as equal velocity air currents 1003. When exiting fan blade 609 without restriction, air quantity 610 can exist as a high velocity stream as shown by the parallel flow lines in FIG. 6b. However, as shown in FIG. 10, air quantity 610 can be forced to spread out as it presses against the inside of outflow resistive layer 1001, thus resulting in flow velocities of air streams 1003 to be equal across all of outflow resistive layer 1001, and of lower velocity than if air quantity 610 were unrestrained. This is important because aboard a spacecraft it is important to avoid high velocity airstreams when possible as they can spread materials throughout the spacecraft cabin volume. Accordingly, the use of the outflow resistive layer 1001 makes the downdraft table of this invention more "spacecraft friendly". It should be noted that the air pressure in FIG. 10 changes from atmospheric pressure 706 to −22 pascals at pressure 709 assuming an air flow 701 velocity of 50 cm/second and a resistivity as resistive layers 702. And that pressure 1002 must be some positive value of Pascals to push air flow 610 through the resistive layer 1001 into the external environment of ambient pressure 706. If the total surface area of the outflow resistive layer 1001 is the same as the resistive layer 702 then given the same air flow 701 rate of 50 cm/second, pressure 1002 would be +11 Pascals and the air flow 1003 velocities would also be 50 cm/second. If however, the outflow resistive layer 1001 is constructed such that it billows out into a larger surface area than resistive layer 702, then the air flow 1003 velocities will be lower than 50 cm/second in proportion to the area ratio. This is important because by sizing the area of the resistive layer 1001, the air flow 1003 velocity may be adjusted to be suitable for any spacecraft or space habitat environment.

FIG. 11 shows a principle application of the invention which is to allow activities such as cooking, equipment service and mealtimes to be freely engaged in while keeping an orderly work surface and without the fear of spreading particulate debris 1105 inside a weightless cabin. Particulates in microgravity tend to spread in a cloud and can easily become an aspiration hazard affecting the safety of astronauts. In FIG. 11, downdraft table 700 is used to host a microgravity cooking device 1101 which is held to the surface of downdraft table 700 by a combination of surface suction from the pressure differential and magnets 1108 which interact with the ferrous steel grate 611. At the completion of a cooking process, food item 1103 is removed 1102 from microgravity cooking appliance 1101. Subsequently, the astronaut user of cooking device 1101 may wish to break apart the food item 1103 into two or more parts 1104 for consumption. In the process of breaking apart or consumption, food crumbs or debris 1105 are generated. Because of air flow 615, the food crumbs or debris 1105 are drawn down to the debris fouled resistive layers 1106 where the captured debris 1107 are pressed onto the outer resistive filter layer 704 by the movement of air currents 701.

FIG. 12 shows the outer resistive filter layer 704 of filter layers 702 fully loaded with debris 1107 such that air currents 701 become blocked on parts of the outer resistive layer 704 of downdraft table 700. When outer resistive layer 704 loads up with excessive debris 1107 the air flows 701 can begin to get clogged and the outer resistive layer 704 can take on a soiled and unsanitary appearance.

FIG. 13 shows the unrolling 1303 of substantially air and debris impermeable layer 1301 in order to cover over debris 1107 loading the debris fouled resistive layers 1106. Impermeable layer 1301 may be constructed from transparent plastic film of about 0.25 mm in thickness and that is bordered with magnetic strips 1302. The top border of downdraft table 700 is also covered by magnetic strips 1304 on all four sides. As impermeable layer 1301 is unrolled, the magnetic strip 1302 on its border magnetically affixes itself to corresponding magnetic strips 1304 on table 700, such that the impermeable layer 1301 magnetically seals to the edges 1305 of table 700 thus capturing debris 1107. Air currents 701 keep the remaining debris 1107 in contact with table surface 702. As impermeable layer 1301 is unrolled 1303, the negative air pressure 709 compared to ambient pressure 706 keeps the impermeable layer in firm contact with debris loaded resistive layers 1106 while the fan blade 609 continues to draw air currents 701 through the debris fouled resistive layers 1106.

FIG. 14 shows impermeable layer 1301 fully unrolled and magnetically sealed to the edges 1305 of the downdraft table 700 thus fully containing debris 1107. Since magnetic attraction between strips 1302 and 1304 is keeping layer 1301 magnetically sealed at the edges 1305, then the fan motor 608 can be turned off. With a downdraft table 700 having a top surface 702 area of 0.5 square meter, the electrical power required to draw air currents 701 through it at 50 cm/second will be approximately 90 watts. Accordingly, by unrolling the magnetically sealed impermeable layer 1301 onto the top of downdraft table 700 and turning fan motor 608 off, then considerable power can be saved on the spacecraft without incurring any danger of the trapped debris 1107 re-entering the cabin atmosphere.

FIG. 15 shows how debris fouled resistive layers 1106 can be safely removed in microgravity. With downdraft table 700's fan blade 609 still drawing air flow 701 through debris fouled resistive layers 1106, the outer resistive layer 704 is rolled up 1501 entrapping debris 1107 in the center of the roll. As outer resistive layer 704 is rolled, inner resistive layer 705 is exposed reducing the pressure difference between the plenum pressure 709 and ambient pressure 706, however sufficient air flow 701 will remain to keep debris 1107 from floating off the surface of the debris fouled resistive layers 1106. Air currents 1502 will help keep the debris 1107 in the roll of outer resistive layer 704. When outer resistive layer 704 is fully rolled up then it can be discarded and a clean new outer resistive layer 704 unrolled in its place.

FIG. 16 shows the downdraft table without the outer resistive layer and ready for a new installation of outer resistive layer 704 to be rolled out. In this state only the clean inner resistive layer 705 is exposed so fan motor 608 can be turned off without fear of debris floating away.

FIG. 17 shows a downdraft cubby 1700 from three different views. The top view 1701 shows that the cubby 1700 is an open bottomed 1702 box bisected by a single blocking beam 1703. The cubby's end view 1704 shows a substantially transparent plastic end wall 1705. The cubby' side view 1706 shows a substantially transparent plastic side wall 1707. In an embodiment, the cubby inside dimensions are roughly 20 cm long, 25 cm long and 15 cm high in order to hold an assortment of small objects 1901 such that they can be viewed in place.

FIG. 18 shows the downdraft cubby 1700 installed onto the resistive layers 702 of the downdraft table 700 by using magnets 1801 on the bottom edge of the cubby that interact with the ferrous steel grate 611. Air currents 701 flow equally across the downdraft table 700 resistive layer's surface 702 and draw air through the open bottom of the cubby shown as air currents 1802.

FIG. 19 shows the downdraft cubby 1700 containing objects 1901 that might include cooking supplies or desk accessories or items for an experiment, for example. Air currents 1802 flow down around the objects 1901 and through air friction and aerodynamic forces keep objects 1901 from floating out of the cubby 1700. Blocking beam 1703 prevents flat objects 1901 from being drawn flat against the resistive layer surface 702 blocking off the ability of the air currents 701 to translate into incoming air currents 1802 that act upon the upper objects 1901. The advantage of the cubby 1700 is that it can hold a stack of objects 1901 rather than just the object 1901 closest to the resistive layer 702. This is because the aerodynamic holding forces of air currents 1802 act mostly on the top object in the stack 1901 which helps to hold down objects 1901 below it.

FIG. 20 shows the microgravity downdraft workstation 2000 comprising the padded blade microgravity saddle 2300 and its attachment flange 2302 to the microgravity downdraft table 700. The downdraft table 700 is then attached to the interior bulkhead 614 of a habitat, a parabolic flight aircraft or a spacecraft in which the invention is to be used. In operation, downdraft table 700 may host equipment attached to its resistive layer surface 702, such as a cooking appliance 1101 attached to the resistive layer surface 702 with magnets 1108. A broad variety of objects may be attached to surface 702 either with magnets or through the vacuum effect of its surface. For example, equipment under repair, food packets, a laptop or elements of a game (like playing cards). Air currents 701 occurring regularly across surface 702 are drawn through that surface by fan motor 608 driving suction fan blade 609 which thereafter forces the air downwards as air currents 1003. Air currents 701 induce downward airflow 615 which serve to draw floating debris down onto the resistive layer surface 702 where the debris are held in place.

FIG. 21a shows a prior art workstation 2100 for microgravity that was used on the Skylab space station which was occupied for 24 weeks between 1973 and 1974. This design had the astronauts place their forefeet into two floor loops 2101 after straddling the thigh clamp 2102. The workstation worktop 2103 had provision for 3 astronauts to face each other but no known provision but straps and Velcro to hold objects to the work surface. The combination of foot loop and thigh clamp also appears difficult to get into and restrictive to upper body movement.

FIG. 21b is a side view showing a prior art microgravity restraint concept 2104 intended to enable a workstation. FIG. 21c is a perspective view of the prior art microgravity restraint concept 2104. FIGS. 21b and 21c are best viewed together with the following description. The astronaut 2105 was expected to pinch their knees together over a molded assembly shown in 2106 and 2108 that had a high friction surface. The molded assembly was to be connected to the spacecraft through mount 2109 and adjusted in position using an extendable rod 2110. There are no known test results for this device; however the example of its use is the astronaut 2105 working on a laptop 2107. The problems seen with this device are that the astronaut needs to continuously apply closing force between their knees to remain stable and not float away. The other problem appears to be, considering that only the knees are stabilized, of how to provide enough reaction torque to quickly move your upper body around in attending to desktop tasks.

FIG. 22a shows an exemplary workstation 2200 for microgravity environments having a padded blade saddle 2202. The astronaut 2201 mounts the padded blade saddle 2202 attached to their microgravity downdraft table 700 enabling the astronaut to have both hands free and the body stability to enable fine motor control of the hands for working on equipment like the food appliance 2203 while potentially reaching for ingredients in the workstation cubby 2205. The workstation is attached to its environment in this case by the bottom flange 2206. It should be noted that the padded blade saddle 2202 could be used independently of the downdraft workstation 2200. For example, the padded blade saddle 2202 could be mounted in front of a control panel or other object needing manipulation and hand dexterity so that the control panel operator is able to use two hands on the controls without being strapped into a seat, as is common in spacecraft.

FIG. 22b shows another view of the workstation 2200 with astronaut 2201 sitting in one padded blade saddle working on an object 2203. On the other side of the microgravity downdraft table 700 one can see the blade portion 2207, the top thigh restraint 2209 and the seat plate 2208 of the padded blade saddle 2202.

FIG. 23a shows the padded blade saddle in profile. The blade may be made of any strong material and is attached to the downdraft table 900 through interface flange 2302. In embodiments, the padded blade 2303 is covered with a soft high friction material like foam rubber or a carpet like material about 5 to 10 cm wide tapered between the thigh position and about 20 cm deep along the axis of the thigh; seat plate 2304 is about 25 cm wide and 20 cm deep; upper thigh clamp 2305 is about 25 cm wide and 25 cm deep and incorporates an adjustment mechanism 2307 which allows the upper thigh clamp 2305 to slide along the length of the padded blade 2303 so as to put the desired amount of thigh pinching pressure for comfort and stability. FIG. 23b shows the seat plate 2304 in profile using section A-A. FIG. 23c shows the relative widths of the seat plate 2304 and upper thigh clamp 2305 in section B-B.

FIG. 24 shows a microgravity environment workstation 2400 having downdraft table 700 with outflow resistive layer 1001 and padded blade microgravity saddle 2300 mounted to the downdraft table 700. FIG. 24 shows a side view of a padded blade microgravity saddle 2300 with a direction of thigh expansion indicated between seat plate 2304 and upper thigh clamp 2305.

FIG. 25 is a perspective view of microgravity environment workstation 2400 having a plurality of padded blade microgravity saddles 2300. FIG. 25 shows how materials 2510 and equipment 2515 are held down to a top side of downdraft table 700 while being used by the astronaut 2201 who is seated in one of the padded blade microgravity saddles 2300.

In operation, the astronaut 2201 mounts the padded blade saddle 2300, and after adjusting the thigh pinching pressure for comfort, thereafter controls the stabilizing force of the padded blade saddle by modulating the closing force between their thighs. According to the Poisson's Ratio principle, as an elastic material is compressed in one direction it tends to widen along an axis perpendicular to the compressive movement. Similarly, as the astronaut uses their inner thigh muscles to pinch the padded blade 2303 between their thighs, the elastic nature of their thigh muscles causes an expansion on an axis parallel to the blade further compressing the thigh between seat plate 2304 and thigh plate 2305. Additionally, the muscles that power the pinching motion knot up and increase in diameter further increasing the compressive forces of the astronaut's thigh between thigh plate 2305 and seat plate 2304. As a result, when the astronaut wishes to increase their stability or immobilization relative to the workstation 2000 (or the spacecraft in general through mounting bulkhead 614), they simply press their thighs more firmly together in an intuitive manner. In doing so, their thigh closing muscle expansion and Poisson's Ratio lead to more surface force against the upper thigh plate 2305 and the inner surface of the seat plate 2304. Additionally, the friction material covering a surface of padded blade 2303 increases friction against the user's thighs. The increased surface friction in combination with the increased contact area between the astronaut 2201 and saddle 2300 stabilizes the astronaut 2201 from linear displacement in all three X, Y, and Z linear axes. The increase in friction also stabilizes the astronaut's thighs in the rotational axes (i.e., roll, pitch and yaw). The resultant six degree-of-freedom stability enables the astronaut 2201 to stabilize and brace their upper body by reacting against their thighs using their hip and torso muscles. By stabilizing their upper body, the astronaut may intuitively stabilize their hand and head motion against reactive forces, thereby increasing eye-hand coordination, two handed dexterity, and an ability to exert force or torque on external objects without needing to brace oneself with another hand. The increased stability improves the use of hand tools, operation of instruments (e.g., a microscope requiring correct placement of the eyes over the microscope's controls), or control of a needle and sutures during a medical procedure, or any number of other activities requiring dexterity and hand-eye coordination that we take for granted when sitting in a chair or standing firmly in Earth's gravity.

There is a positional stability problem in microgravity in that no microgravity seating solutions are currently used on the ISS. Instead, when astronauts work on experiments or other activities needing them to stay in one place, they put their shoes under restraint straps mounted on the surfaces designated as floors throughout the ISS. The advantage of the padded blade microgravity saddle disclosed herein is that it is configured to easily mount in microgravity and provide torso and upper body stability and control with very little thigh closing pressure. This improved stability will enable the astronaut freedom to use both hands because they don't have to hold onto anything for stability. It will also provide more manual fine motor control and upper body stability because the body is anchoring itself to the spacecraft through their thighs rather than knee or forefoot restraints alone, yet still providing upper body freedom to move around. Additionally, if the astronauts relax their legs and stops clamping they will still be unlikely to float away because of the adjustable clamping action of the upper thigh clamp.

Although the invention has been described with reference to the embodiments illustrated in the attached drawing figures, it is noted that equivalents may be employed and substitutions made herein without departing from the scope of the invention as recited in the claims.

The invention claimed is:

1. A workstation for microgravity environments, comprising:
    a downdraft table, comprising:
        a plenum chamber having an inlet and an outlet;
        a fan disposed in the plenum chamber, wherein the fan is configured to draw air into the plenum chamber via the inlet and to exhaust air from the plenum chamber via the outlet;
        a grate disposed across the inlet; and
        an air resistive stack disposed on an outer side of the grate, wherein the air resistive stack comprises:
            a first resistive layer disposed on the grate; and
            a second resistive layer disposed on the first resistive layer, wherein the second resistive layer is configured for rolling such that the second resistive layer may be rolled up and discarded while the first resistive layer partially maintains a pressure differential in the plenum chamber.

2. The workstation of claim 1, comprising:
    an impermeable layer configured for sealing on top of the second resistive layer such that materials are contained against the second resistive layer when the fan is off.

3. The workstation of claim 2, wherein the impermeable layer comprises a transparent plastic film.

4. The workstation of claim 2, wherein the impermeable layer is configured for unsealing from the downdraft table while the fan is on such that the fan provides a pressure differential to maintain materials on the second resistive layer.

5. The workstation of claim 2, wherein the impermeable layer comprises a plurality of magnetic strips configured for magnetically coupling to a plurality of corresponding magnets disposed on the downdraft table such that the impermeable layer is magnetically sealable to edges of the downdraft table.

6. The workstation of claim 5, wherein the magnetic strips are disposed on all four sides of the impermeable layer and the corresponding magnets are disposed on all four sides of the downdraft table.

7. The workstation of claim 1, comprising:
    a third resistive layer operatively coupled outside of the outlet, wherein the third resistive layer is configured to spread airflow exiting the fan over a larger surface area thus reducing an exit velocity of the airflow.

8. The workstation of claim 7, wherein a size of the third resistive layer may be adjusted to adjust the exit velocity of the airflow.

9. A workstation for microgravity environments, comprising:
    a downdraft table, comprising:
        a plenum chamber having an inlet and an outlet;
        a fan disposed in the plenum chamber, wherein the fan is configured to draw air into the plenum chamber via the inlet and to exhaust air from the plenum chamber via the outlet;
        a grate disposed across the inlet;
        an air resistive stack disposed on an outer side of the grate, wherein the air resistive stack comprises:
            a first resistive layer disposed on the grate; and
            a second resistive layer disposed on the first resistive layer; and
    a stability saddle, wherein the stability saddle is attached to an underside of the downdraft table and is configured for a user to stabilize the user's torso while working at the workstation.

10. The workstation of claim 9, wherein the stability saddle comprises:
- a blade member having a proximal end and a distal end and a longitudinal axis extending between the proximal end and the distal end, wherein the blade member is attached to the downdraft table via the proximal end, and the longitudinal axis of the blade member is angled outwardly from the underside of the downdraft table;
- a seat plate mechanically coupled to the distal end of the blade member, wherein the seat plate extends perpendicular to the longitudinal axis from both sides of the blade member; and
- an upper thigh clamp coupled to the blade member in between the proximal end and the distal end, wherein the upper thigh clamp extends perpendicular to the longitudinal axis from both sides of the blade member such that the upper thigh clamp is parallel with the seat plate.

11. The workstation of claim 10, wherein the upper thigh clamp is adjustable along the longitudinal axis of the blade member such that an amount of pressure on a user's thigh may be adjusted for user comfort and stability.

12. The workstation of claim 1, comprising:
- a downdraft cubby comprising:
  - four side walls;
  - an open top;
  - an open bottom;
  - a blocking beam extending between two opposing side walls at the open bottom; and
  - one or more magnets attached to a bottom of one or more sidewalls to attach the downdraft cubby to the grate;

wherein small objects are retained within the downdraft cubby by air flow from the fan.

13. The workstation of claim 12, wherein at least one of the four side walls is transparent.

14. A method of using the workstation for microgravity environments of claim 1, the method comprising:
- operating the fan to create an air flow through the air resistive stack into the plenum chamber that creates a pressure differential between an interior of the plenum chamber and an area above the workstation; and
- drawing particulate matter created in the area above the workstation against a surface of the second resistive layer of the air resistive stack;
- retaining the particulate matter against the surface of the second resistive layer while the fan continues to create the air flow.

15. The method of claim 14, further comprising:
covering the worktable with an impermeable layer; and
stopping the operation of the fan;
wherein power usage by the workstation is minimized while retaining particulate matter on the workstation.

16. The method of claim 14, further comprising:
- removing the second resistive layer and the particulate matter retained on the surface of the second resistive layer from the worktable; and
- adding a clean second resistive layer to the workstation.

17. The method of claim 14, wherein the air flow is approximately 50 to 100 cm/second.

* * * * *